US012805550B2

(12) United States Patent
Oh et al.

(10) Patent No.: US 12,805,550 B2
(45) Date of Patent: Nov. 24, 2026

(54) SYSTEM FOR PREPARING INSTANT RICE WITH TASTE, NUTRITION AND TEXTURE OF CAULDRON RICE

(71) Applicant: CJ CHEILJEDANG CORPORATION, Seoul (KR)

(72) Inventors: Ye Jin Oh, Seoul (KR); Il Sang Jang, Seoul (KR); Eun Hye Kim, Seoul (KR); Hyeong Seon Park, Seoul (KR); Hyo Young Jeong, Seoul (KR); Hye Mi Choi, Seoul (KR); Sung Yoon Jeong, Seoul (KR); In Won Yoon, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 229 days.

(21) Appl. No.: 18/288,616

(22) PCT Filed: Apr. 28, 2022

(86) PCT No.: PCT/KR2022/006114
§ 371 (c)(1),
(2) Date: Oct. 27, 2023

(87) PCT Pub. No.: WO2022/231354
PCT Pub. Date: Nov. 3, 2022

(65) Prior Publication Data

US 2024/0196941 A1 Jun. 20, 2024

(30) Foreign Application Priority Data

Apr. 29, 2021 (KR) ........................ 10-2021-0056073

(51) Int. Cl.
*A23L 7/196* (2016.01)
*A23B 2/40* (2025.01)
*A23L 23/00* (2016.01)

(52) U.S. Cl.
CPC ................ *A23L 7/196* (2016.08); *A23B 2/40* (2025.01); *A23L 23/00* (2016.08)

(58) Field of Classification Search
CPC . A23L 7/196; A23L 23/00; A23B 2/40; A23B 2/30; B65D 77/2024; B65D 81/3438; B65D 81/34
(Continued)

(56) References Cited

U.S. PATENT DOCUMENTS 2,208,552 A * 7/1940 Walter .................. H05B 1/025 425/162
2,941,889 A * 6/1960 Welch ...................... A23L 7/10 426/628

(Continued)

FOREIGN PATENT DOCUMENTS

EP 2164756 B1 6/2016
EP 3680192 A1 * 7/2020 ............... A23B 2/30

(Continued)

OTHER PUBLICATIONS

Office Action issued in corresponding Australian Patent Application No. 2022268139, dated Jan. 31, 2025.

(Continued)

*Primary Examiner* — Jimmy Chou
(74) *Attorney, Agent, or Firm* — Morgan, Lewis & Bockius LLP

(57) ABSTRACT

The present application relates to a system for preparing an instant rice, an instant rice prepared by using the same, and methods of preparing the instant rice.

18 Claims, 2 Drawing Sheets

(58) Field of Classification Search
USPC ........................................................ 99/371
See application file for complete search history.

(56) References Cited

U.S. PATENT DOCUMENTS

| | | | | |
|---|---|---|---|---|
| 2,948,620 | A * | 8/1960 | Ashley | A23B 7/06 99/347 |
| 3,983,260 | A * | 9/1976 | Ford | A47J 27/08 422/26 |
| 4,187,325 | A * | 2/1980 | Tyree, Jr. | A23B 2/85 426/523 |
| 5,055,312 | A * | 10/1991 | Hildebrand | A23B 2/05 426/107 |
| 5,279,212 | A * | 1/1994 | Coupe | A23B 2/003 99/330 |
| 5,860,356 | A | 1/1999 | Kageyama et al. | |
| 6,023,055 | A * | 2/2000 | Yamamoto | A23B 2/82 219/777 |
| 6,153,241 | A * | 11/2000 | Beckeman | A23B 2/30 53/442 |
| 6,310,325 | B1 * | 10/2001 | Colburn | A47J 27/0817 392/416 |
| 7,931,927 | B2 | 4/2011 | Jeong et al. | |
| 9,352,862 | B2 | 5/2016 | Yum et al. | |
| 9,854,825 | B2 | 1/2018 | Fukumori et al. | |
| 2009/0004361 | A1 | 1/2009 | Jeong et al. | |
| 2010/0178401 | A1 | 7/2010 | Van et al. | |
| 2010/0323075 | A1 * | 12/2010 | Takai | A23L 11/65 426/495 |
| 2013/0071546 | A1 * | 3/2013 | Tomoda | A23B 4/0056 392/394 |
| 2013/0156909 | A1 * | 6/2013 | Yum | A23L 5/13 426/396 |
| 2014/0109774 | A1 | 4/2014 | Fukumori et al. | |
| 2014/0251161 | A1 * | 9/2014 | Matsushima | A47J 37/1214 99/348 |
| 2014/0295050 | A1 * | 10/2014 | Sigal | A23P 20/25 99/450.8 |
| 2015/0010679 | A1 * | 1/2015 | Strong | A23L 5/15 99/468 |
| 2015/0072051 | A1 * | 3/2015 | Sigal | A23N 4/085 426/131 |
| 2015/0196155 | A1 * | 7/2015 | Green | B65D 85/70 426/511 |
| 2015/0223627 | A1 * | 8/2015 | Li | A47J 27/09 126/369 |
| 2016/0007638 | A1 * | 1/2016 | Fukumori | A47J 36/34 426/450 |
| 2017/0156376 | A1 | 6/2017 | Van et al. | |
| 2019/0373923 | A1 | 12/2019 | Van et al. | |
| 2021/0198024 | A1 * | 7/2021 | Larson | B65D 77/18 |

FOREIGN PATENT DOCUMENTS

| | | | | |
|---|---|---|---|---|
| EP | 3936334 | A1 * | 1/2022 | A23B 2/30 |
| JP | S60-224478 | A | 11/1985 | |
| JP | H04-258264 | A | 9/1992 | |
| JP | H06-303926 | A | 11/1994 | |
| JP | H08-000195 | A | 1/1996 | |
| JP | H08-256739 | A | 10/1996 | |
| JP | H09-009937 | A | 1/1997 | |
| JP | H09-019277 | A | 1/1997 | |
| JP | H09-084567 | A | 3/1997 | |
| JP | H09-117268 | A | 5/1997 | |
| JP | H09-172992 | A | 7/1997 | |
| JP | H09-187238 | A | 7/1997 | |
| JP | H09-191851 | A | 7/1997 | |
| JP | H10-146160 | A | 6/1998 | |
| JP | H10-225267 | A | 8/1998 | |
| JP | H10-271964 | A | 10/1998 | |
| JP | 2000-333624 | A | 12/2000 | |
| JP | 2002-017318 | A | 1/2002 | |
| JP | 2004-261059 | A | 9/2004 | |
| JP | 2008-118961 | A | 5/2008 | |
| JP | 2010-539972 | A | 12/2010 | |
| JP | 5384762 | B1 | 1/2014 | |
| JP | 5794299 | B2 | 10/2015 | |
| JP | 2017-063758 | A | 4/2017 | |
| JP | 2019-055810 | A | 4/2019 | |
| KR | 10-0265482 | B1 | 9/2000 | |
| KR | 10-2001-0079456 | A | 8/2001 | |
| KR | 10-0877474 | B1 | 1/2009 | |
| KR | 10-1184638 | B1 | 9/2012 | |
| KR | 10-2015-0087556 | A | 7/2015 | |
| KR | 10-2015-0105819 | A | 9/2015 | |
| KR | 10-1615931 | B1 | 4/2016 | |
| WO | WO-2008146166 | A2 * | 12/2008 | B65B 55/18 |
| WO | 2017/037799 | A1 | 3/2017 | |
| WO | WO-2020179771 | A1 * | 9/2020 | A23B 2/30 |

OTHER PUBLICATIONS

Extended European Search Report issued in corresponding European Patent Application No. 22796186.9, dated Mar. 26, 2025.
International Search Report issued in corresponding International Patent Application No. PCT/KR22/006114, dated Apr. 28, 2022.
"Aseptic Packaged Rice", Journal of the Japan Society of Packaging Science, vol. 20, No. 5, 2011, pp. 447-458, (with partial English Machine translation).
"Catalog of the RIC-15T Rapid Cooking and Sterilization Test Machine", Hisaka Works, Ltd., Published in 1998, 3 pages, (with partial English Machine translation).
Mukai, Development of an Aseptic Rice Production System, Japan Food Science, Published in 2001, pp. 39-43, (with partial English Machine translation).
Shidara et al., "Research and Development of Technologies for Continuous Steam Heating for Food", Japan Journal of Food Engineering, vol. 12, No. 4, Dec. 2011, pp. 117-122 (with English abstract).
Shimizu et al., "Basics and Applications of Retort Foods", , SaiwaiShobo Co., Ltd., First Edition, Second Printing (Partially Revised), Mar. 20, 2002, pp. 224-234, (with partial English Machine translation).
Takano et al., "he Cutting Edge of Aseptic Packaging and Sterilization Technology", Published by Science Forum Co., Ltd., First Edition, First Printing, Jun. 30, 1999, pp. 91-97, (with partial English Machine translation).
Tsutsumi, "Recently Highlighted Machines and Equipment I—A Proposal for Food Production Systems Pursuing Taste and Safety", Food Industry, Sep. 30, 2004, pp. 29-41, (with partial English Machine translation).
Yokoyama et al., "Next-Generation Aseptic Packaging Technology: Pursuing Quality and Safety", Science Forum Co., Ltd., First Edition, First Printing, Nov. 30, 2004, pp. 155-161, (with partial English Machine translation).
Office Action issued in corresponding Japanese Patent Application No. 2023-566691, dated Sep. 17, 2024.
Notification of Third Party Observation issued in corresponding Japanese Patent Application No. 2023-566691, dated Sep. 17, 2024.
Office Action issued in corresponding Japanese Patent Application No. 2023-566691, dated Apr. 30, 2025.

* cited by examiner

【Figure 1】
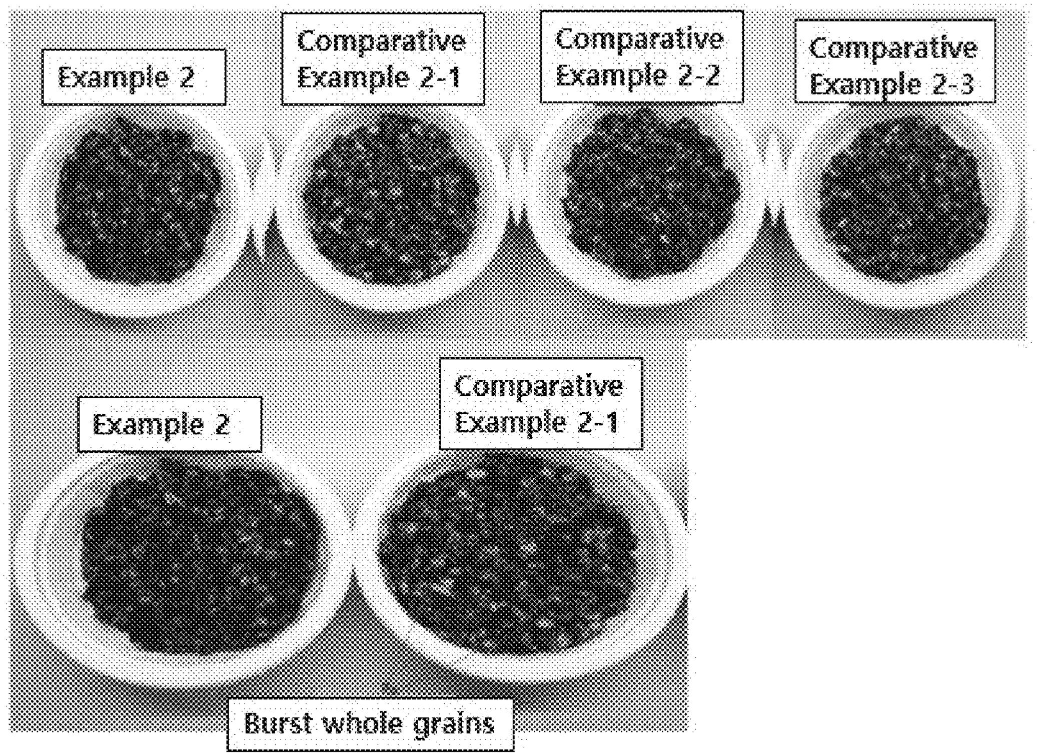

【Figure 2】
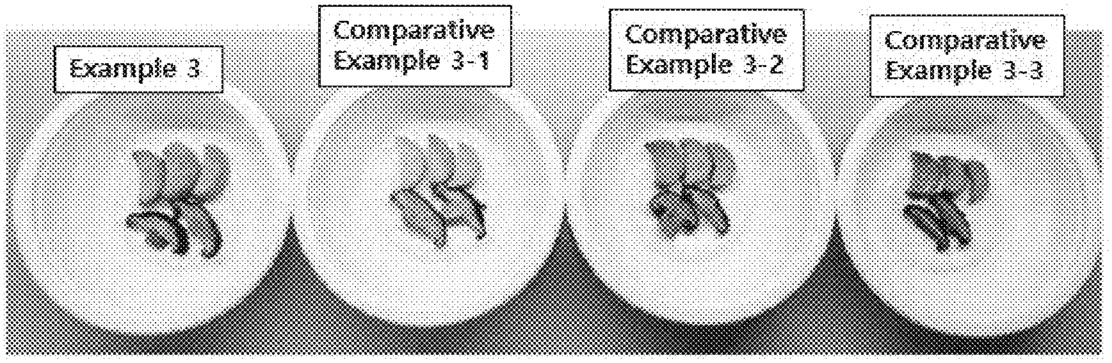

SYSTEM FOR PREPARING INSTANT RICE WITH TASTE, NUTRITION AND TEXTURE OF CAULDRON RICE

TECHNICAL FIELD

The present application relates to a system for preparing an instant rice and an instant rice prepared thereby.

BACKGROUND ART

Cooked grains (Bap) is a staple food in East Asia including Korea, Japan and China, and is a type of food commonly eaten throughout Asia including Southeast Asia and South Asia. In recent years, the number of people consuming the Bap has increased not only in Asia but also in Western countries, and the Bap has now become a popular food even in Western countries. In particular, rice, a main raw ingredient of the Bap, is becoming more popular as it is known that the rice is nutritionally excellent.

Generally, Bap may be cooked and prepared by washing grains such as rice in water, soaking the grains, then removing water and heating the grains. However, in order to cook rice properly, it is important to accurately measure and use the amount of water according to the amount of grains, and depending on heating conditions and methods, the final taste or texture of Bap may vary greatly, and thus skilled skill or experience is required to make Bap above a certain level. Since it is not easy to cook the consistent and high-quality Bap, electric rice cookers have been developed only for the purpose of cooking Bap. Since the Bap is a type of food eaten as a staple food, the Bap needs to be cooked every day or in large quantities, but has a disadvantage that the cooking process is cumbersome and not easy. In particular, with the recent trend of increasing single-person households and developing dining culture, the number of people who want to cook and eat the Bap at home through the cumbersome process is decreasing, and on the contrary, the demand for an instant rice in the form of instant food is increasing.

The instant rice is sold as cooked rice in a package, and thus there is an advantage that consumers who purchase the instant foo may eat the instant food right away, and easily enjoy high-quality Bap through a simple cooking process using a microwave, etc. However, in instant foods that are distributed for a long period of time and stored at room temperature, there is a high need to control microbial contamination through sufficient sterilization. If excessive sterilization conditions are applied to sterilize instant rice, the quality of Bap may be damaged and deteriorated. Therefore, it is an important problem to solve in the field of instant rice to achieve a sterilization effect while maintaining the quality of Bap.

The solving of the above problems becomes more important in instant rice, which uses more raw ingredients other than white rice even in the instant rice. When using raw ingredients that contain a lot of moisture or are susceptible to microbial contamination, sterilization and quality is difficult deterioration due to sterilization is noticeable, so that the need for sterilization and quality control is particularly emerging. In the case of a mixed rice in the form of instant rice on the market, since raw ingredients vulnerable to microbial contamination are use, even if the sterilization conditions are satisfied, the quality of Bap is significantly reduced to have poor texture and taste in many cases. Korean Laid-open Patent Publication No. 10-2015-0105819 discloses a method for preparing sterile packaged instant flavored glutinous rice containing nuts, and a method of first cooking flavored glutinous rice by mixing ingredients, and then heating the rice to high temperature to sterilize and package the rice, and thus, it discloses only a method without considering a problem of deterioration of Bap quality due to sterilization at all. Recently, the convenience food market is gradually increasing, and as the demand for various types of the instant food in addition to the existing white rice Bap increases, a demand for the instant food having similar quality to food cooked at home or in restaurants and a need for development thereof are also increasing.

PRIOR ART DOCUMENT

Patent Document (Patent Document 1) Korean Laid-open Patent Publication No. 10-2015-0105819

DISCLOSURE

Technical Problem

It is an object of the present application to provide a system for preparing an instant rice effectively by reducing the number of microorganisms in instant rice below a threshold value through a sufficient sterilization and reducing a process for maintaining sterile conditions without damaging the rice quality by sterilization when preparing the instant rice.

It is another object of the present application to provide an instant rice having excellent quality that embodied the taste, nutrition, and texture of cauldron rice even while containing microorganisms below a threshold value by preparing through the system described above.

Technical Solution

An aspect of the present application provides a system for preparing an instant rice including a sterilizing unit that sterilizes raw ingredients filled in a container with pressurized steam in a vacuum state; a filling unit that adds sterilized water or sterilized sauce to the sterilized raw ingredients; a sealing unit that seals the container added with the water or sauce; and a heating unit that heats the sealed container at a temperature of 90° ° C. to 125° C.

Another aspect of the present application provides an instant rice prepared by the system.

Hereinafter, the present application will be described in detail.

The term “cooked grains (Bap)” used herein refers to all foods prepared by adding water to grains, pressurizing, and heating the grains. When compared to porridge, the Bap is maintained in the form of grains, characterized to be chewed and eaten, and has a feature of having less moisture than porridge. The Bap may be commonly taken as a staple food in East Asia including Korea and Southeast Asia, and mainly prepared using rice, but may be prepared with other grains instead of rice, or prepared by mixing rice with other grains, or may be prepared using additional ingredients other than grains.

The term “instant rice” used herein means Bap made in the form of an instant food. The instant rice is a processed food that is able to be eaten in itself without a separate cooking process, or eaten through a simpler cooking process than a conventional method of preparing and cooking Bap, and prepared for convenient storage, reposition, transportation, and portability.

System for Preparing Instant Rice

A system for preparing an instant rice includes a sterilizing unit that sterilizes raw ingredients filled in a container with pressurized steam in a vacuum state; a filling unit that adds sterilized water or sterilized sauce to the sterilized raw ingredients; a sealing unit that seals the container added with the water or sauce; and a heating unit that heats the sealed container at a temperature of 90° ° C. to 125° C.

Although the instant rice prepared through the preparing method of the present application is in the form of instant rice, the instant rice may exhibit excellent quality that embodies the taste, nutritional value, texture, etc. of hot pot rice. The hot pot rice refers to Bap cooked using a pot, and specifically, may be Bap cooked in a pressure rice pot or an iron pot, and particularly a stone pot and an iron pot such as a cast iron pot, to embody more improved texture.

The raw ingredients may include any ingredient as long as it may be commonly used to make Bap, and the type of raw ingredients may be appropriately selected and used depending on the type of Bap to be prepared.

Specifically, the raw ingredients may include at least one selected from the group consisting of grains, beans, mushrooms, root and tuber crops, bulbs, seasoned vegetables, fruits/seeds, meat, fish, and eggs. The grains may include rice or mixed grains other than rice, and the rice may include at least one selected from the group consisting of white rice, black rice, brown rice, non-glutinous rice, and glutinous rice. The mixed grains may include at least one selected from the group consisting of barley, soybeans, red beans, foxtail millet, wheat, rye, bran, buckwheat, oats, millet, corn, and sorghum. However, the type of mixed grain is not limited thereto, and any mixed grain may be used as long as it may be commonly used in the preparation of Bap, and for example, any mixed grain may be used as long as it is used for the preparation of mixed grain rice or nutritious rice. The instant rice of the present application may be prepared using only raw ingredients other than white rice, or may be used with both white rice and raw ingredients other than white rice. The beans may include at least one selected from the group consisting of white beans, green kernel black beans, black beans, yellow beans, medicinal beans, kidney beans, peas, black azuki beans, mung beans, lentils, horse beans, and red beans, but are not limited thereto, and the beans may include all edible plants classified as the legume family. The mushrooms may include at least one selected from the group consisting of king oyster mushroom, shiitake mushroom, oyster mushroom, button mushroom, and enoki mushroom. However, the type of mushroom is not limited thereto, and any edible mushroom may be used without limitation, and for example, any mushroom may be used as long as it is used for preparing mushroom rice. The bulbs may include at least one selected from the group consisting of lotus root, burdock, carrot, and bellflower root, but are not limited thereto. The root and tuber crops may include at least one selected from the group consisting of sweet potatoes, potatoes, and pork potatoes, but are not limited thereto. The seasoned vegetables may include at least one selected from the group consisting of seasoned aster, seasoned thistle, bracken fern, sedum, groundsel, chives, thunberg onion, butterbur, wild garlic, purslane, and aralia, but are not limited thereto. The fruits/seeds may include at least one selected from the group consisting of jujubes, chestnuts, pine nuts, raisins, and pumpkin seeds, but are not limited thereto. The meats may include lean meat, muscle, fat, or mixtures thereof isolated from at least one animal selected from the group consisting of cattle, horse, sheep, goat, deer, and poultry (chicken, duck, geese, turkey, ostrich, turkey, and pheasant), but are not limited thereto. The fish meat includes meat isolated from marine products, eggs of marine products, or foods processed thereof, and for example, may be raw meat isolated from marine products, paste, fish cake, fish meat sausage, etc., but is not limited thereto. The marine products may be fish (cod, pollack, croaker, mackerel, Spanish mackerel, saury, etc.), squid, octopus, octopus minor, shrimp, crab, clam meat, etc., and the roes of the marine products may be pollack roe, cod roe, flying fish roe, shark roe, etc., but are not limited thereto. The eggs include foods obtained from eggs obtained from animals, such as poultry eggs or egg processed products, and may all include eggs, whole eggs, egg yolk, egg white, etc. Specifically, the eggs may be eggs, duck eggs, quail eggs, goose eggs, ostrich eggs, or processed products thereof, but are not limited thereto.

The raw ingredients may include raw ingredients other than white rice (e.g., grains other than white rice, beans, mushrooms, root and tuber crops, seasoned vegetables, fruits/seeds, meats, fish meat, eggs, etc.) in an amount of 10 to 100 parts by weight based on 100 parts by weight of the total raw ingredients. Specifically, the content of the raw ingredients other than white rice may be in a range consisting of a lower limit selected from 10 parts by weight, 15 parts by weight, 20 parts by weight, 25 parts by weight, 30 parts by weight, 35 parts by weight, 40 parts by weight, 45 parts by weight, 50 parts by weight, 55 parts by weight, and 60 parts by weight, and/or an upper limit selected from 100 parts by weight, 95 parts by weight, 90 parts by weight, 85 parts by weight, 80 parts by weight, 75 parts by weight, 70 parts by weight, and 65 parts by weight. For example, the content of the raw ingredients other than white rice may be 10 to 100 parts by weight, 15 to 95 parts by weight, 20 to 90 parts by weight, 30 to 85 parts by weight, 40 to 80 parts by weight, 50 to 80 parts by weight, 60 to 70 parts by weight, or 60 to 65 parts by weight, but is not limited thereto. When the content of the raw ingredients other than white rice is 100 parts by weight, the raw ingredients may not contain white rice at all, and in this case, an instant rice prepared using the raw ingredients may not also contain white rice at all. The "rice", a concept that includes white rice, black rice, brown rice, etc., may be any rice as long as it is commonly used for preparing Bap regardless of its type, and may be, for example, japonica or indica rice, but is not limited thereto. In addition, the rice may be non-glutinous rice, glutinous rice, or a combination thereof. The non-glutinous rice may contain starch ingredients of amylose and amylopectin, and the glutinous rice starch may contain starch ingredient of amylopectin. Compared to the non-glutinous rice, the glutinous rice may have more stickiness of Bap when cooking the rice. In addition, the rice may be used regardless of its degree of polishing, and may be 50% polished rice, 70% polished rice, and/or 90% polished rice, in addition to the white rice and brown rice. The types of rice described above may be appropriately selected depending on the type and characteristics of Bap to be finally prepared, and the mixing ratio of each type of rice may also be appropriately selected and used.

In the present application, the raw ingredients used in the preparation of an instant rice are susceptible to microbial contamination because the number of microorganisms contained therein is greater than the number of microorganisms contained in other raw ingredients, or may not be sufficiently sterilized through a conventional sterilization process. Specifically, the raw ingredients may have the number of microorganisms of $10^2$ cfu/ml to $10^8$ cfu/ml in the raw ingredients before sterilization, and for example, the number of microorganisms may be in the range of $10^3$ cfu/ml to $10^7$ cfu/ml, 1,500 cfu/ml to 5,000,000 cfu/ml or 1,800 cfu/ml to 4,500,000 cfu/ml. In addition, the number of microorganisms in the raw ingredients before sterilization may be the number of microorganisms measured before sterilizing a mixture of two or more raw ingredients. The number of microorganisms in the raw ingredient mixture before sterilization may be $10^5$ cfu/ml to $10^8$ cfu/ml, and for example, the number of microorganisms in the raw ingredient mixture before sterilization may be 500,000 cfu/ml to 5,000,000 cfu/ml or 550,000 cfu/ml to 1,200,000 cfu/ml. Accordingly, when considering an effect on the health of people who eat instant rice and a legal acceptable level of the number of microorganisms in instant rice, in order to meet the standard by reducing the number of microorganisms contained in instant rice prepared using the raw ingredients, stricter sterilization may be required than when using other raw ingredients. However, when instant rice is prepared through strict sterilization conditions and sterilization methods, microbial contamination may be controlled, but there is a problem that the quality of instant rice may decrease due to the sterilization process. The present application is an invention intended to solve the problems that occur when preparing instant rice using the raw ingredients, and the instant rice prepared using the system for preparing the instant rice of the present application has an effect of not deteriorating the quality of the instant rice even while exhibiting a sufficient sterilization effect.

The system for preparing the instant rice of the present application may further include a raw ingredient filling unit that fills the container with raw ingredients before the sterilizing unit. The raw ingredient filling unit may fill each container with each type of raw ingredients, or may fill the container after mixing two or more raw ingredients. The raw ingredient filling unit may include a measuring device, and the raw ingredients in one container amount may be measured by weight or volume and distributed to each container by the measuring device.

In the system for preparing the instant rice of the present application, the sterilizing unit may perform pressurized steam sterilization in a vacuum state with respect to a container filled with the raw ingredients by the raw ingredient filling unit, or a container filled with the raw ingredients through a separate process. The container filled with the raw ingredients may be transferred to the sterilizing unit by a conveyor. The sterilizing unit may include a vacuum pump for forming a vacuum state, and the vacuum pump may be controlled by a vacuum valve. The sterilizing unit may include a device for injecting air, and the pressure within the sterilizing unit may be controlled by the injected air. Steam generated from a steam generator may be injected into the sterilizing unit. The steam is clean steam in a sterilized state, and the raw ingredients filled in the container are sterilized by high-temperature steam. After the sterilization by steam is performed, the steam is converted to the form of water and may remain in the sterilizing unit, so that the sterilizing unit may include a drain unit for discharging the water generated by converting the steam. The sterilizing unit may sequentially perform vacuum, steam sterilization, reduced pressure, and vacuum cooling. The container filled with the raw ingredients that have been sterilized by the sterilizing unit may be moved through the conveyor to a tunnel-shaped booth where sterile conditions are maintained.

The sterilizing unit may perform the sterilization with steam at 120° ° C. to 140° C. for 1 to 10 minutes. Specifically, the steam temperature may be a temperature in the range consisting of a lower limit selected from 120° C., 121° C., 122° C., 123° C., 124° C., 125° C., 126° C., 127° C., 128° C., 129° C., and 130° C., and/or an upper limit selected from 140° ° C., 139° ° C., 138° C., 137° C., 136° C., 135° C., 134° C., 133° C., 132° C., 131° C., and 130° C. For example, the sterilizing step may be performed with steam at 120° ° C. to 140° C., 121° C. to 139° C., 122° C. to 138° C., 123° C. to 137° C., 124° C. to 136° C., 125° C. to 135° C., 126° ° C. to 134° C., 127° ° C. to 133° C., 128° C. to 132° C., 129° C. to 131° C., 129° C. to 130° ° C. or 130° C. to 131° C., but is not limited thereto. The sterilization time may be the time in the range of a lower limit selected from 1 minute, 2 minutes, 3 minutes, 4 minutes, 4 minutes and 30 seconds, 5 minutes, 5 minutes and 30 seconds, 6 minutes, 6 minutes and 30 seconds and 7 minutes, and/or an upper limit selected from 10 minutes, 9 minutes 30 seconds, 9 minutes, 8 minutes 30 seconds, 8 minutes, 7 minutes 30 seconds, 7 minutes, 6 minutes 30 seconds, and 6 minutes. For example, the sterilization may be performed for 1 minute to 10 minutes, 2 minutes to 9 minutes, 3 minutes to 8 minutes, 4 minutes to 7 minutes, 5 minutes to 6 minutes, 5 minutes 30 seconds to 6 minutes, 5 minutes to 5 minutes 30 seconds, 6 minutes to 10 minutes, 7 minutes to 10 minutes, or 7 minutes to 9 minutes, but is not limited thereto, and the sterilisation time may vary within the above range depending on the volume of raw ingredients to be sterilized. For example, when preparing the instant rice in a volume suitable for one meal per person, the sterilization time may be generally 4 minutes to 6 minutes, and when preparing the instant rice in a larger volume than the volume for one meal per person, the sterilization time may be increased to a range of 7 minutes to 10 minutes and may be appropriately changed depending on the volume.

In addition, the sterilizing unit may perform the sterilization by repeatedly contacting the raw ingredients with steam 5 to 10 times at 140° ° C. to 155° C. for 3 to 10 seconds. Specifically, the steam temperature may be in the range consisting of a lower limit selected from 140° ° C., 142° C., 145° C., and 147° C. and/or an upper limit selected from 155° C., 153° C., 150° C., and 148° C. For example, the sterilization may be performed with steam at 140° ° C. to 155° C., 142° C. to 153° C., 145° C. to 150° C., 145° C. to 148° C., 147° C. to 150° C. or 147° ° C. to 148° C., but is not limited thereto. The steam contacting time may be the time consisting of a lower limit selected from 3 seconds, 4 seconds, 5 seconds and 6 seconds and/or an upper limit selected from 10 seconds, 9 seconds, 8 seconds and 7 seconds. For example, the steam contacting time may be 3 seconds to 10 seconds, 4 seconds to 9 seconds, 5 seconds to 8 seconds, 6 seconds to 8 seconds, 5 seconds to 7 seconds, or 6 seconds to 7 seconds, but is not limited thereto. The contacting of the raw ingredients with the steam may be repeated 5 to 10 times, 6 to 9 times, 6 to 8 times, 7 to 9 times, or 7 to 8 times.

The sterilizing unit may include a RIC sterilization device. For example, the RIC sterilization device may be a device manufactured by Hisaka Seisakusho Co., Ltd., but is not limited to this device. The device may perform the sterilization by creating an environment in the sterilizing unit in a vacuum state and injecting high-temperature steam, and perform the sterilization by setting the temperature, pressure, and time conditions as described above. In addition to the device, any device may be included in the sterilizing unit of the system of the present application as long as it may perform the sterilization by injecting high-temperature steam in a vacuum state.

The sterilization performed by the sterilizing unit may be performed under conditions of an F0 value of 4 or higher. In the present application, the term "F value" refers to the time required to kill a specific microbial strain at a specific temperature, which may be calculated through a heat lethal time curve for the microorganism. The F value may be determined according to Z value and a heating temperature according to a type of microorganism to be sterilized. Among them, “F0 value” may be defined as F value when Z value is 18° F. or 10° C. and the heating temperature is 250° F. or 121.1° C. The Z value of 10° C. is based on the value when sterilizing a standard microbial strain. The F0 value is a value that may be used as a measure of the level of sterilization in the art. Specifically, the F0 value may be measured by a probe of a sensor, which is a cumulative amount of heat transferred to a sample during the heat treatment time. For example, the F0 value may be measured by inserting the probe of the sensor into a cold point (a point where heat is transferred last within the sample or generally the center of the sample) in the sample and then checking the cumulative amount of heat to be transferred during heat application, and may be converted and calculated by setting the amount of heat corresponding to 121.1° C. and 1 minute to ‘F0=1’. The F0 value may be calculated according to Equation 1 below. Specifically, the sterilization performed by the sterilization unit may be performed under a condition of an F0 value of 4 or more, 4.5 or more, 5 or more, 6 or more, 7 or more, 8 or more, 10 or more, 20 or more, 30 or more, or 40 or more, but is not limited thereto.

$$F_0 = t(\text{time}) \times 10^{\frac{T(\text{Temperature}) - 121.1^\circ \text{C.}}{10^\circ \text{C.}}} \quad \text{[Equation 1]}$$

wherein, the unit of t (time) is minute, and the unit of T (temperature) is ° C.

When the raw ingredients are sterilized by the sterilizing unit, the number of microorganisms contained in a final instant rice product manufactured by the system of the present application may fall below a threshold value to exhibit a sufficient sterilization effect.

In the system for preparing the instant rice of the present application, the sterilized raw ingredients may be moved from the sterilizing unit to the sealing unit while maintain the sterile conditions. Since the sterilized raw ingredients may be contaminated from biological particles such as microorganisms and other non-biological particles from the outside before the sealing of the container, there is a need to control the contaminant particles floating in the air. The method of maintaining the sterile conditions may be applied without limitation as long as it is a method and condition commonly applied to the production of food in the art, and specifically, the sterile conditions commonly applied to the preparation of processed foods, instant foods, retort foods, etc. may be applied. The sterile conditions may be maintained by using a clean room or clean booth, and for example, the container may be moved through a tunnel-shaped booth from the sterilizing unit until before the sealing unit. In this case, the inflow of microorganisms may be prevented through clean air generated from a clean air generator (for example, a HEPA filter) installed in the booth, and the inside of the booth may be maintained at positive pressure.

The filling unit performs the addition of sterilized water or sterilized sauce to the sterilized raw ingredients. The raw ingredients sterilized by the sterilizing unit are moved to the filling unit while filled in the container and maintained under the sterile conditions, but the filling unit adds the water or sauce to the raw ingredients. The filling unit may include a device for holding the water or sauce. In addition, the filling unit may include a measuring device, and the water or sauce in one container amount may be measured by weight or volume and distributed to each container by the measuring device. After water is added, the filling unit may add water so that the amount of water becomes an amount of 30 parts by weight to 120 parts by weight based on 100 parts by weight of raw ingredients, specifically 30 parts by weight to 110 parts by weight, 40 parts by weight to 105 parts by weight, 50 parts by weight to 100 parts by weight, 60 parts by weight to 95 parts by weight, or 70 parts by weight to 90 parts by weight. When the sterilized sauce is added, the sterilized water and the sterilized sauce may be added together or only the sterilized sauce may be added. The sauce may be a liquid sauce and may vary depending on a type or characteristics of the instant rice to be prepared, and for example, the sauce may include soy sauce, garlic, green onions, sugar, salt, sesame oil, honey, or combinations thereof. The amount of the water or sauce may be appropriately controlled in consideration of the taste and quality of the instant rice to be implemented in the final instant rice product, and may be controlled in consideration of the amount of water or sauce that is heated and evaporated in the subsequent heating unit. The measured water or sauce may be filled by a liquid filling nozzle of the filling unit. The filling unit may further include a device for injecting inert gas into the container filled with the raw ingredients, and the inert gas may be filled by a gas filling nozzle.

The system for preparing the instant rice of the present application may further include a liquid sterilizing unit for sterilizing the water or sauce. The liquid sterilizing unit may spray steam at 130° ° C. to 140° ° C. directly into the water or sauce to perform the sterilization for 6 to 8 minutes, and the water or sauce sterilized by the liquid sterilizing unit is filled into the raw ingredients in the filling unit. Specifically, the steam temperature may be a temperature in the range consisting of a lower limit selected from 130° C., 130.5° C., 131° C., 131.5° ° C., 132° C. and 132.5° ° C. and/or an upper limit selected from 140° ° C., 139° C., 138° ° C., 137° C., 136° C., 135° C., 134.5° C., 134° C., 133.5° C., 133° C. and 132.5° C. For example, the sterilization may be performed with steam at 130° C. to 140° C., 130.5° C. to 138° C., 131° C. to 136° C., 131.5° C. to 135° C., 132° C. to 133° C., 132.5° ° C. to 135° C. or 130° to 132.5° C., but is not limited thereto. The sterilization performed by the liquid sterilizing unit may be performed by spraying and injecting the steam at the temperature directly into the water or sauce to raise the temperature, and then passing the water or sauce through a pipe that maintains heat for 6 to 8 minutes. Specifically, the sterilization time after the steam injection may be 6 minutes to 8 minutes, 6 minutes 30 seconds to 8 minutes, 6 minutes to 7 minutes 30 seconds, 6 minutes 30 seconds to 7 minutes 30 seconds, 7 minutes to 8 minutes, or 6 minutes to 7 minutes.

The liquid sterilizing unit may include a Direct-Steam Injection (DSI) sterilization device. The DSI sterilization device may perform sterilization by spraying steam directly into the water or sauce, and perform sterilization by setting the temperature and time conditions as described above.

The liquid sterilizing unit may be more effective in sterilizing the sauce. Since the liquid sauce further contains other ingredients in addition to water, there is a problem in that the liquid sauce is more vulnerable to microbial contamination than general water or may not be sufficiently sterilized through a general sterilization process. Accordingly, stricter sterilization is required to reduce the number of microorganisms in the sauce below a threshold value. When the sterilization is performed by directly spraying the steam to contact the sauce through the liquid sterilizing unit included in the system of the present application, there is an effect that the quality of the sauce does not deteriorate while exhibiting a sufficient sterilization effect on the liquid sauce by performing the sterilization under the conditions within the range.

The water or sauce sterilized by the liquid sterilizing unit may be stored and moved while maintaining the sterile conditions, and the raw ingredients may be filled by the filling unit in a sterilized state without the introduction of external microorganisms or foreign substances.

The sealing unit may perform a process of attaching the lid material to the container added with the water or sauce. The sealing unit may further include a device for injecting inert gas into the container filled with the raw ingredients. In addition, the sealing unit may bring a lid material into contact with an open side of the container filled with the raw ingredients that is transferred through the conveyor, and then attach the lid material and the container. The attachment may be performed using heat, adhesive, or pressure, but is not limited thereto, and any method may be used as long as it is commonly used to seal processed foods to prevent microorganisms or foreign substances from being introduced from the outside. The sealing unit may include a heating device, a device for holding an adhesive, a device for applying an adhesive to a portion of the lid material or the container, or a device for applying pressure to a contact portion between the lid material and the container, depending on the attachment method between the lid material and the container. After the lid material and the container are sealed by the sealing unit, external foreign substances or microorganisms may not be introduced into the container by a natural method, so that microbial contamination is able to be controlled, and sterile conditions is not to be necessarily maintained after the sealing. The container and the lid material used in the system for preparing the instant rice of the present application may be used without limitation in shape, material, size, etc., as long as the container and the lid material may be commonly used in the preparation of processed food, and may be a container and a lid material that are not deformed or damaged even by the heating unit to be subsequently performed. For example, the lid material may be a lead film, but is not limited thereto.

The system for preparing the instant rice of the present application may not include a cooking unit. Specifically, the system of the present application may not include the cooking unit after the sterilizing unit and before the sealing unit. The cooking unit generally performs a process of heating raw ingredients of rice in the process of preparing Bap. Specifically, the cooking unit may be heated to 90° C. to 120° C. Since hot heat is applied to the instant rice during the sterilization process, quality deterioration may occur due to high temperature. The system of the present application does not include the cooking unit to reduce the number of times to heat raw ingredients, thereby preventing the quality of the instant rice from deteriorating due to repeated heating. In addition, the raw ingredients sterilized by the sterilizing unit may be introduced with microorganisms from the outside before the sealing, and thus sterile conditions need to be complied with, but the system of the present application does not include the cooking unit before the sealing unit to have advantages of reducing the opportunity for additional microbial contamination and reducing the time and space that need to be maintained under sterile conditions, thereby reducing costs and increasing efficiency.

The system for preparing the instant rice of the present application may maintain a temperature of 89° C. or lower from the sterilizing unit to the sealing unit. Specifically, the temperature may be maintained at 89° ° C. or lower, 88° C. or lower, 87° C. or lower, 85° C. or lower, 80° C. or lower, 75° C. or lower, 70° C. or lower, 10° C. to 89° C., 15° C. to 88° C., 200° C. to 85° C., 25° C. to 80° C., 20° C. to 70° C., 200° C. to 60° C. or 20° C. to 50° C., but is not limited thereto. In the system for preparing the instant rice of the present application, as the temperature in the range is maintained before the sealing unit, there is an effect capable of reducing the number of times of heating the raw ingredients and preventing the quality of the instant rice from being deteriorated by heating. In addition, before the sealing unit, since microorganisms may be introduced into the container, sterile conditions need to be complied with to prevent microbial contamination, but when the temperature in the above range is maintained before the sealing unit, there is an advantage that the time to be maintained in sterile conditions may be reduced. Accordingly, there is an effect capable of reducing the cost for creating sterile conditions and lowering the possibility of microbial contamination.

The meaning of "maintaining the temperature" is a concept including not only the case where the temperature in the above range is continuously maintained without interruption in time, but also the case where a temperature condition higher than the above temperature range is temporarily given for a short period of time, that is, the concept including the cases where the above temperatures are continuously maintained, and are ultimately the same under the technical common sense in the art. For example, even if the temperature condition higher than the above temperature range is temporarily given, it is included in the scope of the present application so long as no significant sterilization effect occurs or no change in the quality of Bap occurs. For example, the temperature condition higher than the above temperature range may be given for the time within 1 second, within 2 seconds, within 3 seconds, within 5 seconds, within 10 seconds, or within 20 seconds, and the temperature condition higher than the above temperature range may be given two times or more for a short period of time.

The heating unit of the system for preparing the instant rice of the present application heats the sealed container at a temperature of 125° ° C. or lower. Specifically, the heating unit may heat the sealed container to a temperature of 90° ° C. to 125° C. for 10 to 25 minutes. The heating temperature may be a temperature in the range consisting of a lower limit selected from 90° C., 91° C., 92° C., 93° C., 94° C., 95° C., 96° C., 97° C., 98° C., 99° C., 100° C., 105° C., 107° C., 110° C., 112° C. and 115° C. and/or an upper limit selected from 125° ° C., 124° C., 123° C., 122° C., 121° C., 120° C., 119° C., 118° ° C., 117° C., 116° C. and 115° C. For example, the heating may be performed at a temperature of 90° C. to 125° C., 91° C. to 125° C., 92° C. to 124° C., 93° C. to 124° C., 94° ° C. to 123° C., 95° C. to 123° C., 95° C. to 122° C., 95° C. to 121° C., 96° C. to 121° C., 97° C. to 121° C., 100° C. to 120° C., 105° C. to 119° C., 107° C. to 118° C., 110° ° C. to 115° C., 110° ° C. to 118° C., 110° ° C. to 116° C., or 112° C. to 116° C., but is not limited thereto.

The sterilization time may be a time in the range consisting of a lower limit selected from 10 minutes, 11 minutes, 12 minutes, 13 minutes, 14 minutes, 15 minutes, 16 minutes, 17 minutes, 18 minutes, 19 minutes and 20 minutes, and/or an upper limit selected from 25 minutes, 24 minutes, 23 minutes, 22 minutes, 21 minutes, and 20 minutes. For example, the heating may be performed for 10 minutes to 25 minutes, 11 minutes to 24 minutes, 12 minutes to 23 minutes, 15 minutes to 22 minutes, 17 minutes to 21 minutes, 19 minutes to 20 minutes, 20 minutes to 21 minutes, 12 minutes to 17 minutes, 13 minutes to 16 minutes, 18 minutes to 23 minutes, 19 minutes to 22 minutes, or 19 minutes to 21 minutes, but is not limited thereto. The temperature range and the time range may vary depending on the types of raw ingredients.

When the heating is performed according to the temperature range and the time, there is an advantage of enabling more complete microbial control by exhibiting additional sterilization effects. In addition, through the heating process under the conditions, the instant rice prepared by the system of the present application reaches a level similar to Bap prepared through the preparing process of conventional rice to have the rice quality suitable for eating, and prevent the deterioration of the rice quality due to an excessive heating condition, thereby preparing an instant rice with excellent quality.

The heating unit may include a retort sterilization device. The retort sterilization device may be used without limitation as long as the retort sterilization device may be commonly used when manufacturing retort food, but heating may be performed by setting the temperature and time conditions as described above. The heating according to the temperature and time conditions may be performed at a temperature lower than the heating temperature during conventional retort sterilization, and specifically, may be lower than a retort sterilization heating temperature commonly used in preparing conventional instant rice. Since the conditions are milder conditions than the temperature and time conditions commonly used in the preparation of instant rice using a retort sterilization device, compared to a conventional device for preparing instant rice that perform excessively hot heating, the system of the present application may prevent the quality of the instant rice from being deteriorated due to high temperature to prepare instant rice with excellent texture and taste. In addition, the heating temperature conditions of the heating unit may be higher than the heating temperature during 'steaming', which is performed to transfer heat to the inside of the food in the general cooking process of rice.

The number of microorganisms in the raw ingredients measured after the heating unit may be 0 cfu/ml. In the raw ingredients included in the instant rice prepared by the system for preparing the instant rice of the present application, all general bacteria and heat-resistant bacteria are killed, so that the number of microorganisms may be 0 cfu/ml. Accordingly, the system for preparing the instant rice of the present application has an advantage of exhibiting a sufficient sterilization effect without deteriorating the quality of the raw ingredients included in the instant rice.

The instant rice prepared by the system for preparing the instant rice of the present application may be easy to be cook and store as an instant food, and also may have a texture and taste quality similar to Bap prepared through a general rice recipe at home or in a restaurant. In addition, even if raw ingredients that are vulnerable to microbial contamination or not easy to sterilize are used, it is possible to prepare an instant rice in which the number of microorganisms may be controlled through sufficient sterilization and the quality of Bap does not deteriorate due to sterilization.

The system for preparing the instant rice of the present application may further include an immersing unit for immersing the raw ingredients in water. The immersing unit may be included before the sterilizing unit, and specifically may be included to immerse the raw ingredients in water before the raw ingredient filling unit. The immersing unit may include a device for holding water for immersing the raw ingredients, and may include a device for adding the water to the raw ingredients through a liquid filling nozzle. The water is used preferably with sterilized water, but considering subsequent sterilization by the sterilizing unit, general drinking water may be used instead of using strictly sterilized water. The immersing unit may include a measuring device, and perform the immersion for 20 to 80 minutes by measuring the amount of immersion water by the measuring device to add 200 to 300 parts by weight of water based on 100 parts by weight of the entire raw ingredients, but is not limited thereto. The immersing process by the immersing unit may be performed in the same manner as the process of soaking grains in water when generally cooking and preparing rice. The immersing unit may further include a device for immersing the raw ingredients for a certain period of time and then discharging and removing the immersion water. The draining process may be to completely discharge the water in the container, or to discharge 0 to 10 parts by weight of water based on 100 parts by weight of raw ingredients to be filled together in the container.

The system for preparing the instant rice of the present application may further include a cooling unit and/or drying unit. The cooling unit may be located downstream of the heating unit and may cool the heated instant rice container using cooling water or natural wind, but is not limited thereto. The cooling unit may include a cooling water injection device or a natural wind generator. The drying unit may dry the instant rice container using a warm air generator or by leaving at room temperature, but is not limited thereto.

The system for preparing the instant rice of the present application may further include an inspection and selection unit. The inspection and selection unit may inspect whether foreign substances are mixed into the sealed container or perform a weight test of the container. The inspection and selection unit may include a device that separates instant rice that passed a test result standard from instant rice that did not pass the test result standard to be moved to a separate space.

The system for preparing the instant rice of the present application may further include a packaging unit. The packaging unit may package one or more final instant rice products with separate packaging materials, and may, for example, perform a process of putting a certain number of instant rice into one box.

2. Instant Rice

The instant rice of the present application or the instant rice prepared by the system for preparing the instant rice of the present application may be prepared in the form of instant rice of whole grain rice, mushroom nutritious rice, honey glutinous rice, etc. according to a type and combination of raw ingredients.

2-1. Whole Grain Rice

Whole grain rice is an instant rice including a sealed container; and multi-grain rice made from mixed grains contained in the container, wherein the mixed grains include one or more selected from the group consisting of brown rice, black rice, whole wheat, oats, barley, beans, red beans, foxtail millet, and sorghum, and the multi-grain rice is contained in an amount of 90 parts by weight or more based on 100 parts by weight of the contents contained in the container, and the number of microorganisms in the instant rice may be negative within a shelf life.

The whole grain rice may further include raw ingredients commonly used when generally preparing whole grain rice in addition to the mixed grains listed above, and the mixed grains may not include white rice. The mixed grains include brown rice and black rice, and the brown rice may be at least one selected from the group consisting of non-glutinous brown rice and glutinous brown rice.

The mixed grains may be included in an amount of 90 parts by weight or more based on 100 parts by weight of the contents contained in the container. Specifically, the content of the grains may be 90 parts by weight or more, 91 parts by weight or more, 92 parts by weight or more, 93 parts by weight or more, 94 parts by weight or more, 95 parts by weight or more, 96 parts by weight or more, 97 parts by weight or more, 98 parts by weight, 99 parts by weight or more, 99.5 parts by weight or more, 99.9 parts by weight or more, 100 parts by weight, 90 parts by weight to 99.9 parts by weight, 90 parts by weight to 99.5 parts by weight, 90 parts by weight to 99 parts by weight, 91 parts by weight to 99 parts by weight, 92 parts by weight to 99 parts by weight, 93 parts by weight to 99 parts by weight, 94 parts by weight to 99 parts by weight, 95 parts by weight to 99 parts by weight, 96 parts by weight to 99 parts by weight, 97 parts by weight to 99 parts by weight, 98 parts by weight to 99 parts by weight, 90 parts by weight to 98 parts by weight, 91 parts by weight to 98 parts by weight, 92 parts by weight to 98 parts by weight, 93 parts by weight to 98 parts by weight, 94 parts by weight to 98 parts by weight, 95 parts by weight to 98 parts by weight, 96 parts by weight parts by weight to 98 parts by weight, or 97 parts by weight to 98 parts by weight, but is not limited thereto. When the content of mixed grains is 100 parts by weight, the instant rice of the present application may include only mixed grains, or may include only mixed grains other than white rice.

When the mixed grains include at least one selected from the group consisting of whole wheat and oats, the whole wheat or oats with burst surfaces among the whole wheat or oats in the multi-grain rice may be contained in an amount of 10 parts by weight or less, 9 wt % or less, 8 wt % or less, 7 wt % or less, 6 wt % or less, or 5 wt % or less based on 100 parts by weight of the entire whole wheat or oats. In the present application, the term "burst surface" may be defined as exposing 10% or more of the endosperm portion of a grain based on the entire surface area of the rice grain. In other words, in the instant rice of the present application, among the whole wheat or oat grains included therein, the endosperm portions thereof are exposed to be less than 10% of the surface area of each grain, so that the burst whole wheat or oat grains are 10% or less of the entire whole wheat or oat grains. Whole grain rice in the form of instant rice, which is available on the market, needs to pay special attention to microorganism control and sterilization, and to this end, when sterilizing instant rice under strict sterilization conditions, surface bursting may occur in grains such as whole wheat and oats where the grains are prone to bursting. If the surfaces of the grains burst, the appearance may not look good to the eye, which may reduce the preference of the appearance, and physical properties related to texture, including hardness, may also decrease, resulting in a decrease in the quality of instant rice. However, although the instant rice of the present application contains grains that may cause surface bursting, the instant rice has excellent texture and appearance quality due to a high proportion of grains with unburst surfaces, and even though the quality is not damaged, the number of microorganisms in instant rice is 0 CFU/ml, so that there is an effect that sterilization of microorganisms has been sufficiently performed.

The brown rice may be included in an amount of 30 to 70 parts by weight based on 100 parts by weight of the contents contained in the container. Specifically, non-glutinous brown rice may be included in an amount of 10 to 30 parts by weight based on 100 parts by weight of the contents contained in the container. In addition, glutinous brown rice may be included in an amount of 20 to 40 parts by weight based on 100 parts by weight of the contents contained in the container.

The black rice may be included in an amount of 5 to 15 parts by weight based on 100 parts by weight of the contents contained in the container.

At least one selected from the group consisting of the whole wheat and barley may be included in an amount of 5 to 15 parts by weight based on 100 parts by weight of the contents contained in the container.

The brown rice may be non-glutinous brown rice or glutinous brown rice. The non-glutinous brown rice may be added in a content of 5 parts by weight to 12 parts by weight based on 100 parts by weight of the contents when preparing the instant rice of the present application. The glutinous brown rice may be added in a content of 10 parts by weight to 20 parts by weight based on 100 parts by weight of the contents when preparing the instant rice of the present application.

The black rice may be added in a content of 3 parts by weight to 10 parts by weight based on 100 parts by weight of the contents when preparing the instant rice of the present application. The whole wheat may be added in a content of 3 parts by weight to 10 parts by weight based on 100 parts by weight of the contents when preparing the instant rice of the present application. The oats may be added in a content of 3 parts by weight to 10 parts by weight based on 100 parts by weight of the contents when preparing the instant rice of the present application.

The whole grain rice may contain 3 parts by weight to 7 parts by weight of dietary fiber based on 100 parts by weight of the contents contained in the container. In addition, the whole grain rice may contain 3.5 parts by weight to 10 parts by weight of proteins based on 100 parts by weight of the contents contained in the container.

The number of microorganisms in the whole grain rice may be 0 CFU/ml when measured at a time point of 9 months or less after the preparation of instant rice.

The chromaticity of grains in instant rice measured after heating the whole grain rice in a 700 W microwave for 1 minute to 3 minutes, 1 minute 30 seconds to 2 minutes 30 seconds, or 2 minutes may have L value of 20 to 25, a value of 4 to 7, and b value of 3 to 5.5.

The instant rice may have one or more of the following physical properties obtained by measuring the multi-grain rice included in the container using a physical property analyzer, after heating the instant rice in a 700 W microwave for 1 minute to 3 minutes and 1 minute 30 seconds to 2 minutes 30 seconds, more specifically for 2 minutes: (i) hardness of 25 to 35; (ii) elasticity of 33 to 38; (iii) adhesiveness of 29.5 to 31; and (iv) stickiness of 23.3 to 25.

2-2. Mushroom Nutritious Rice

The mushroom nutritious rice is instant rice including a sealed container; and mushroom rice made from grains and mushrooms contained in the container, wherein Bap in the mushroom rice is included in a content of 60 parts by weight to 90 parts by weight based on 100 parts by weight of the contents contained in the container, and the mushrooms in the mushroom rice is included in a content of 10 parts by weight to 30 parts by weight based on 100 parts by weight of the contents contained in the container, and the number of microorganisms in the instant rice may be negative within a shelf life.

The mushroom nutritious rice may further include raw ingredients generally used when preparing whole grain rice, in addition to the raw ingredients (grains and mushrooms) listed above, and the instant rice may further include white rice.

The Bap prepared by the grains may include rice, and further include at least one selected from the group consisting of barley, soybeans, red beans, foxtail millet, wheat, rye, bran, buckwheat, oats, millet, corn, and sorghum, as grains other than rice.

The mushrooms prepared by cooking the mushrooms may include at least one selected from the group consisting of king oyster mushroom, shiitake mushroom, oyster mushroom, button mushroom, and enoki mushroom.

The Bap in the mushroom rice or the Bap prepared from the grains may be included in a content of 60 parts by weight to 90 parts by weight based on 100 parts by weight of the contents contained in the container.

The mushrooms in the mushroom rice or the mushroom prepared by cooking the mushrooms may be included in a content of 10 parts by weight to 30 parts by weight based on 100 parts by weight of the contents contained in the container.

The non-glutinous rice may be added in a content of 40 parts by weight to 60 parts by weight based on 100 parts by weight of the contents when preparing the instant rice of the present application. In addition, the glutinous rice may be added in a content of 5 parts by weight to 15 parts by weight based on 100 parts by weight of the contents when preparing the instant rice of the present application.

The black rice may be added in a content of 1 part by weight to 7 parts by weight based on 100 parts by weight of the contents when preparing the instant rice of the present application.

The shiitake mushroom may be added in a content of 10 parts by weight to 25 parts by weight based on 100 parts by weight of the contents when preparing the instant rice of the present application. In addition, the king oyster mushroom may be added in a content of 10 parts by weight to 25 parts by weight based on 100 parts by weight of the contents when preparing the instant rice of the present application.

The mushroom nutritious rice may further include a liquid sauce, and the sauce may include a shiitake hot water extract.

The chromaticity of king oyster mushroom in the instant rice measured after heating the instant rice of the present application in a 700 W microwave for 1 minute to 3 minutes, 1 minute 30 seconds to 2 minutes 30 seconds, more specifically 2 minutes may have L value of 50 to 70, a value of 3 to 5, and b value of 15.5 to 16.5.

The king oyster mushroom may be included in the form having a length of 3 cm or more and a thickness of 6.5 mm or more.

The king oyster mushroom included in the instant rice of the present application, compared to the thickness of the king oyster mushroom in the raw ingredients state before preparing the instant rice, may have 25% or less or 21% to 25% of a thickness shrinkage of king oyster mushrooms measured after heating the instant rice in a 700 W microwave for 1 minute to 3 minutes, 1 minute 30 seconds to 2 minutes 30 seconds, more specifically 2 minutes.

The moisture content of mushrooms in the mushroom rice or mushrooms prepared by cooking the mushrooms may be 70% to 85%.

The king oyster mushroom included in the mushroom nutritious rice may have one or more of the following physical properties obtained by measuring the king oyster mushroom using a physical property analyzer, after heating the instant rice in a 700 W microwave for 1 minute to 3 minutes and 1 minute 30 seconds to 2 minutes 30 seconds, more specifically for 2 minutes: (i) tissue strength (max stress, dyn/cm$^2$ value of the king oyster mushroom of 160,000 to 220,000; and (ii) area value (erg/cm$^3$) of the king oyster mushroom of 18,000 to 28,000.

2-3. Honey Glutinous Rice

The honey glutinous rice is instant rice including a sealed container: and honey glutinous rice made from at least one raw ingredient selected from the group consisting of jujubes, nuts and raisins, rice and sauce contained in the container, wherein the raw ingredients other than rice in the honey glutinous rice are contained in an amount of 5 parts by weight to 20 parts by weight based on 100 parts by weight of the contents contained in the container, the nuts are contained in an amount of 7 parts by weight to 18 parts by weight based on 100 parts by weight of the contents contained in the container, and the number of microorganisms in the instant rice may be negative within a shelf life.

The rice may include at least one selected from the group consisting of white rice, black rice, brown rice, non-glutinous rice, and glutinous rice.

The nuts may be at least one selected from the group consisting of chestnuts, pine nuts, pumpkin seeds, and peanuts.

The raw ingredients other than rice in the honey glutinous rice may be contained in an amount of 5 parts by weight to 20 parts by weight based on 100 parts by weight of the contents filled in the container.

The nuts may be contained in an amount of 7 parts by weight to 18 parts by weight based on 100 parts by weight of the contents contained in the container.

The non-glutinous rice may be added in a content of 10 parts by weight to 20 parts by weight based on 100 parts by weight of the contents when preparing the instant rice of the present application. In addition, the glutinous rice may be added in a content of 55 parts by weight to 65 parts by weight based on 100 parts by weight of the contents when preparing the instant rice of the present application.

The chestnuts may be added in a content of 8 parts by weight to 18 parts by weight based on 100 parts by weight of the contents when preparing the instant rice of the present application. In addition, the pumpkin seeds may be added in a content of 0.5 parts by weight to 3.5 parts by weight based on 100 parts by weight of the contents when preparing the instant rice of the present application. In addition, the raisins may be added in a content of 1.5 parts by weight to 4.5 parts by weight based on 100 parts by weight of the contents when preparing the instant rice of the present application. In addition, the pine nuts may be added in a content of 0.5 parts by weight to 1.5 parts by weight based on 100 parts by weight of the contents when preparing the instant rice of the present application.

The honey glutinous rice may further include a liquid sauce, and the sauce may include honey.

The chromaticity of the rice in the honey glutinous rice may be L value of 33.5 to 36, a value of 5.5 to 6.5, and b value of 13.5 to 14.5. The chromaticity of the raw ingredients in the honey glutinous rice measured after heating the honey glutinous rice in a 700 W microwave for 1 minute to 3 minutes, 1 minute 30 seconds to 2 minutes 30 seconds, or 2 minutes may have L value of 27 to 29, a value of 6.5 to 7, and b value of 10 to 11.

The honey glutinous rice may have one or more of the following physical properties obtained by measuring the Bap in the honey glutinous rice included in the container using a physical property analyzer, after heating the honey glutinous rice in a 700 W microwave for 1 minute to 3 minutes and 1 minute 30 seconds to 2 minutes 30 seconds, more specifically for 2 minutes: (i) hardness of 15 to 35; (ii) elasticity of 40 to 60; (iii) adhesiveness of 25 to 40; and (iv) stickiness of 65 to 105.

Advantageous Effects

A system for preparing the instant rice according to the present application has an effect of being able to prepare an instant rice capable of exhibiting a sufficient sterilization effect due to the number of microorganisms in the final instant rice lower than a threshold value even when the instant rice is prepared using raw ingredients that are susceptible to microbial contamination or difficult to sterilize and having excellent quality with the taste, nutritional value, and texture of hot pot rice because the issue of reduced rice quality that can occur due to strict sterilization does not occur.

In addition, the system for preparing the instant rice according to the present application, compared to a general system for preparing instant rice, has advantages in terms of cost and microbial safety by using a new preparing principle to minimize changes in quality by reducing the number of heating times, and to simplify the time or steps to be performed by maintaining sterile conditions.

However, the effects of the present application are not limited to the effects described above, and other effects not described will be clearly understood by those skilled in the art from the following description.

DESCRIPTION OF DRAWINGS

FIG. 1 is a diagram of comparing the grain appearances in whole grain rice (Example 2) of the present application and whole grain rice of Comparative Examples 2-1 to 2-3, wherein it can be confirmed that in the instant rice of Comparative Example 2-1, many whole grains with burst surfaces are found, but almost no surface bursting phenomenon occur in the instant rice of Example 2.

FIG. 2 is a diagram of comparing king oyster mushroom appearances in mushroom nutritious rice (Example 3) of the present application and mushroom nutritious rice of Comparative Examples 3-1 to 3-3, wherein it can be confirmed that the king oyster mushroom of Example 3 has a relatively bright color.

BEST MODE

Hereinafter, the present application will be described in detail by the Examples.

However, the following Examples specifically illustrate the present application, and the content of the present application is not limited by the following Examples.

EXAMPLES AND COMPARATIVE EXAMPLES

Examples 1-1 and 1-2: White Rice Bap

A white rice Bap was prepared using white rice as a raw ingredient according to a system for preparing instant rice of the present application. Specifically, 110 g of white rice was first washed with water, immersed in the immersing unit, and then filled into a container. The container filled with 110 g of the immersed rice was moved to an RIC device (manufactured by Hisaka Seisakusho company) corresponding to the sterilizing unit, and a steam pressure sterilization was performed at a temperature of 130° C. for 1 minute and 30 seconds in a vacuum state. The sterilization condition corresponds to a sterilization condition in which an F0 value was 4 or more. After the sterilization was completed, 95 g of sterilized water was added to the container in the filling unit, and then the container was sealed with a lid material to prevent external microorganisms or foreign substances from being introduced into the container. The sealed container was moved to a retort sterilization device corresponding to the heating unit and heated at a temperature of 115° C. for 20 minutes to prepare instant rice of Example 1-1. The temperature and time conditions of the device correspond to relatively less strict conditions compared to conventional retort sterilization conditions.

In addition, an instant rice of Example 1-2 was prepared through all the same process as Example 1-1, except that in the sterilizing step, instead of sterilizing using an RIC device, a pressure sterilization was performed by repeatedly heating 8 times at a temperature of 148° C. for 6 seconds. The pressure sterilization condition also corresponds to a sterilization condition in which an F0 value is 4 or more.

Comparative Examples 1-1 to 1-4: White Rice Bap

An instant rice of Comparative Examples 1-1 to 1-4 was prepared using white rice as a raw ingredient. The instant rice of Comparative Examples 1-1 and 1-2 was prepared through the same system as Example 1-1 above, except as prepared by varying heating conditions of the heating unit after sealing the container. The instant rice of Comparative Example 1-3 was prepared in the same manner as Example 1-1, except as prepared by further including a cooking process before the sealing of the container after the sterilization step. The white rice of Comparative Examples 1~4 was prepared using a conventional method of preparing rice at home.

The instant rice of Comparative Example 1-1 was completed by performing the same method as Example 1-1 until the sealing of the container, except as prepared by steaming the sealed container at a temperature of 95° C. or lower, specifically, heating at a temperature of 85° C. for 20 minutes, instead of the heating condition of Example 1-1.

The instant rice of Comparative Example 1-2 was prepared under general retort heat sterilization conditions to prepare instant rice by performing the same method as in Example 1-1 until the sealing of the container, except as prepared by heating the sealed container in a retort sterilization device at a temperature of 123° C. for 18 minutes, instead of the heating condition of Example 1-1.

In Comparative Example 1-3, after performing a steam pressure sterilization at 130° C. for 1 minute and 30 seconds in the same manner as in Example 1-1, a cooking process was further performed again by adding and heating sterilized water to a temperature of 98° C. for 35 minutes. This corresponds to a process performed in a conventionally known instant rice preparing process. After the cooking step, the instant rice of Comparative Examples 1-3 was prepared through the same heating step as in Example 1 by sealing and heating the container in a retort sterilization device at 115° C. for 20 minutes.

In Comparative Example 1-4, white rice was prepared according to a conventional preparing method of white rice prepared at home, and specifically, by washing 300 g of white rice with water, removing the water, placing the white rice in a rice cooker, and adding 420 g of cooking water, the rice was cooked and prepared under pressure cooking conditions.

Example 2: Whole Grain Rice

Whole grain rice of Example 2 was prepared using various whole grains other than white rice as raw ingredients, according to the system for preparing instant rice of the present application. Specifically, non-glutinous brown rice, glutinous brown rice, black rice, whole wheat, and oats were used as raw ingredients, and a mixing ratio of each raw ingredient was listed in Table 1 below. The raw ingredients were washed with water, immersed in the immersing unit, and then filled into a container. The filled container was moved to an RIC device (manufactured by Hisaka Seisakusho Co., Ltd.) corresponding to the sterilizing unit, and a steam pressure sterilization was performed at a temperature of 130° C. for 5 minute and 30 seconds in a vacuum state. The sterilization condition corresponds to a sterilization condition in which an F0 value is 4 or more. After the sterilization of the raw ingredients was completed, sterilized water was added to be finally mixed in a ratio according to Table 1 below.

TABLE 1

| Raw ingredients | Mixing ratio (%) |
|---|---|
| Non-glutinous brown rice | 8.05 |
| Glutinous brown rice | 14.09 |
| Black rice | 6.04 |
| Whole wheat | 6.04 |
| Oats | 6.04 |
| Water | 59.74 |
| Total | 100.00 |

After adding water to the container, the container was sealed with a lid material to prevent external microorganisms or foreign substances from being introduced into the container. The sealed container was moved to a retort sterilization device corresponding to the heating unit and heated by setting conditions of a temperature of 115° ° C. for 20 minutes to prepare instant rice of Example 2. The temperature and time conditions of the device correspond to relatively less strict conditions compared to conventional retort sterilization conditions.

Comparative Examples 2-1 to 2-3: Whole Grain Rice

Whole grain rice of Comparative Examples 2-1 to 2-3 was prepared using raw ingredients mixed in the mixing ratio according to Table 1 above. An instant rice was prepared in the same manner as the method for preparing the whole grain rice in Example 2, but some conditions were varied.

The instant rice of Comparative Example 2-1 was completed by performing the same method as in Example 2 until the sealing of container, except as prepared by steaming the sealed container at a temperature of 95° C. or lower, specifically heating at a temperature of 85° C. for 20 minutes, instead of the heating step of Example 2.

The instant rice of Comparative Example 2-2 was prepared under a conventional retort heat sterilization condition by performing the same method as in Example 2 until the sealing of the container, except as prepared by heating the sealed container in a retort sterilization device at a temperature of 123° C. for 18 minutes, instead of the heating condition of Example 2.

In Comparative Example 2-3, after performing a steam pressure sterilization at 130° ° C. for 5 minute and 30 seconds in the same manner as in Example 2, a cooking process was further performed by adding and heating sterilized water to a temperature of 98° C. for 35 minutes again. This corresponds to a process performed in a conventionally known instant rice preparing process. In Comparative Examples 2-3, after the cooking step, by sealing and heating the container in a retort sterilization device at 115° C. for 20 minutes, an instant rice was prepared through the same heating step as in Example 2.

Example 3: Mushroom Nutritious Rice

Mushroom nutritious rice of Example 3 was prepared using grains other than white rice and various mushrooms as raw ingredients according to the system for preparing instant rice of the present application. Specifically, non-glutinous rice, glutinous rice, black rice, shiitake mushroom, and king oyster mushroom were used as the raw ingredients, and corn oil was added to the raw ingredients washed with water to be filled into the container.

The mixing ratio of each raw ingredient was listed in Table 2 below. The filled container was moved to an RIC device (manufactured by Hisaka Seisakusho company) corresponding to the sterilizing unit, and a steam pressure sterilization was performed at a temperature of 130° C. for 5 minute and 30 seconds in a vacuum state. The sterilization condition corresponds to a sterilization condition in which an F0 value is 4 or more.

TABLE 2

| Raw ingredients | Mixing ratio (%) |
|---|---|
| Non-glutinous rice | 47.6 |
| Glutinous rice | 11.9 |
| Black rice | 3.9 |
| Shiitake mushroom | 17.5 |
| King oyster mushroom | 17.5 |
| Corn oil | 1.6 |
| Total | 100.00 |

Then, sterilized shiitake hot water extract, refined salt, and water were added to the raw ingredients sterilized with RIC. In this case, the shiitake hot water extract, refined salt, and water may also be sterilized using a conventional heat sterilization method, but when using a sterilization method (130° C., 6 minutes) using a direct steam injection heater (DSI), a better microbial sterilization effect may be expected. Thereafter, the container was sealed with a lid material to prevent external microorganisms or foreign substances from being introduced into the container. The sealed container was moved to a retort sterilization device and heated by setting conditions of a temperature of 115° C. for 20 minutes to prepare instant rice of Example 3. The temperature and time conditions of the device correspond to a relatively less strict condition compared to conventional retort sterilization conditions.

Comparative Examples 3-1 to 3-3: Mushroom Nutritious Rice

Mushroom nutritious rice of Comparative Examples 3-1 to 3-3 was prepared using raw ingredients mixed in the mixing ratio according to Table 2 above. The instant rice was prepared in the same manner as the method for preparing the mushroom nutritious rice in Example 3, except that some conditions were varied.

The instant rice of Comparative Example 3-1 was completed by performing the same method as in Example 3 until the sealing of container, except as prepared by steaming the sealed container at a temperature of 95° C. or lower, specifically, heating at a temperature of 85° C. for 20 minutes, instead of the heating condition of Example 3.

The instant rice of Comparative Example 3-2 was prepared under the conventional retort heat sterilization conditions by performing the same method as in Example 3 until the sealing of the container, except as prepared by heating the sealed container in a retort sterilization device at a temperature of 123° C. for 18 minutes, instead of the heating condition of Example 3.

In Comparative Example 3-3, after performing a steam pressure sterilization at 130° C. for 5 minute and 30 seconds in the same manner as in Example 3, a cooking process was further performed by adding and heating sterilized water to a temperature of 98° ° C. for 35 minutes again. This corresponds to a process performed in a conventionally known instant rice preparing process. After the cooking step, the instant rice of Comparative Examples 3-3 was prepared through the same heating step as in Example 3 by sealing and heating the container in a retort sterilization device at 115° C. for 20 minutes.

Example 4: Honey Glutinous Rice

Honey glutinous rice of Example 4 was prepared using liquid sauces such as honey, soy sauce and syrup, and various raw ingredients according to the system for preparing instant rice of the present application. Specifically, non-glutinous rice, glutinous rice, sugared chestnuts, pumpkin seeds, raisins, pine nuts and sesame oil were used as the raw ingredients, and corn oil was added to the raw ingredients washed with water to be filled into the container. The mixing ratio of each raw ingredient was listed in Table 3 below. The filled container was moved to an RIC device (manufactured by Hisaka Seisakusho company), and a steam pressure sterilization was performed at a temperature of 130° ° C. for 5 minute and 30 seconds in a vacuum state. The sterilization condition corresponds to a sterilization condition in which an F0 value is 4 or more.

TABLE 3

| Raw ingredients | Mixing ratio (%) |
|---|---|
| Non-glutinous rice | 15.5 |
| Glutinous rice | 62.0 |
| Sugared chestnuts | 13.8 |
| Pumpkin seeds | 1.9 |
| Raisins | 2.9 |
| Pine nuts | 1.0 |
| Sesame oil | 1.0 |
| Corn oil | 1.9 |
| Total | 100.00 |

After sterilization of the raw ingredients was completed, a liquid sauce with a salt content of 0.9% and a sugar content of 28 brix was prepared by mixing cinnamon concentrate, dark soy sauce, honey, simple syrup, brown sugar, oligosaccharide HF and refined salt, which was sterilized to be added to the container. The liquid sauce was sterilized by directly injecting steam at a temperature of 130° C. into the sauce using a direct steam injection heater (DSI) to raise the sauce temperature to 130° C. and maintain the state for 6 minutes. After adding the liquid sauce, the container was sealed with a lid material to prevent external microorganisms or foreign substances from being introduced into the container. The sealed container was moved to a retort sterilization device and heated by setting conditions of a temperature of 115° C. for 20 minutes to prepare the instant rice of Example 4. The temperature and time conditions of the device correspond to a relatively less strict condition compared to conventional retort sterilization conditions.

Comparative Examples 4-1 and 4-2: Honey Glutinous Rice

Honey glutinous rice of Comparative Examples 4-1 and 4-2 was prepared using raw ingredients mixed in the mixing ratio according to Table 3 above and a liquid sauce. An instant rice was prepared in the same manner as the method for preparing the honey glutinous rice in Example 4, except that some conditions were varied.

In Comparative Example 4-1, after performing the same method as in Example 4 until the sealing of container, a liquid sauce was sterilized and added through a general liquid sterilization method by heating at 100° C. for 10 minutes or more. In addition, an instant rice was prepared under the conventional retort heat sterilization conditions by heating the sealed container in a retort sterilization device at a temperature of 123° C. for 18 minutes, instead of the heating condition in Example 4.

In Comparative Example 4-2, a liquid sauce was sterilized using a direct steam injection heater (DSI) under the same conditions as in Example 4 above, but the raw ingredients were sterilized by heating at 98° ° C. for 20 minutes and then sterilized under the condition where F0 was less than 4. After adding the liquid sauce and then sealing the container, an instant rice was prepared under the conventional retort heat sterilization condition by heating the sealed container in a retort sterilization device at a temperature of 123° C. for 18 minutes, instead of the heating step in Example 4.

Experimental Example 1

[1-1] Comparison of Chromaticity in White Rice

The lid materials of the instant rice (white rice Bap) of Examples 1-1, Example 1-2, and Comparative Examples 1-1 to Comparative Examples 1-3, which were prepared using white rice as raw ingredients, were removed and their colors were measured and compared. In addition, the color of the white rice of Comparative Examples 1~4 prepared at home using a conventional cooking method was also measured and compared. For the colors, L, a, and b values were measured using an instrument manufactured by Konica Minolta company, and each value was measured three times, and average values thereof were shown in Table 4 below.

TABLE 4

| Before heating | L | a | b |
|---|---|---|---|
| Example 1-1 | 71.51 | −1.75 | 9.40 |
| Example 1-2 | 70.44 | −1.86 | 8.87 |
| Comparative Example 1-1 | 71.23 | −2.14 | 5.87 |
| Comparative Example 1-2 | 70.28 | −1.47 | 9.35 |
| Comparative Example 1-3 | 69.39 | −1.48 | 9.48 |

As a result, as can be seen in Table 4 above, in the instant rice of Example 1-1 of the present application, L value was measured to be the highest, and in the instant rice of Example 1-2, L value was measured to be lower than that of Comparative Example 1-1, but measured to be relatively high. In particular, in the instant rice of Examples 1-1 and 1-2 prepared by the preparing system of the present application, it was confirmed that L value of white rice was high as compared to the instant rice of Comparative Example 1-3. In the case of the instant rice prepared using white rice as raw ingredients, the color of Bap shown immediately after the consumer who eats an instant rice removed the lid material corresponds to the appearance quality that may be immediately perceived by the consumer and thus has an important influence on preference, and among them, the L value related to brightness may act as an important role. In the process of preparing the Bap, the color of white rice is darkened due to heat to have a negative effect on preference. The instant rice of Example 1-1 prepared according to the preparing system of the present application had the highest L value and thus was not darkened greatly in color even during the heating process, and the instant rice of Example 1-2 also showed a relatively high L value. Thus, it could be identified that the system for preparing the instant rice of the present application may provide an instant rice with an appearance that meets the consumer's preference while not damaging the external appearance quality of the instant rice.

[1-2] Analysis of Cooked Rice Taste of White Rice Bap

With respect to the instant rice (white rice Bap) of Examples 1-1 and 1-2, and Comparative Examples 1-1 to 1-3 heated using a microwave and white rice of Comparative Example 1-4, the cooked rice taste values of each instant rice are shown in Table 5 below by measuring the appearance, hardness, glutinousness, balance, and palatability of rice grains using a taste meter (Tensipresser My Boy 2 system, Taketomo Electric company, Japan).

TABLE 5

| | Appearance | Hardness | Glutinousness | Balance | Palatability |
|---|---|---|---|---|---|
| Example 1-1 | 5.7 | 6.8 | 5.8 | 5.7 | 64 |
| Example 1-2 | 4.8 | 7.3 | 5.0 | 4.8 | 59 |
| Comparative Example 1-1 | 3.3 | 8.0 | 3.6 | 3.3 | 49 |
| Comparative Example 1-2 | 5.2 | 7.3 | 5.3 | 5.0 | 60 |
| Comparative Example 1-3 | 6.1 | 6.8 | 6.2 | 6.0 | 66 |
| Comparative Example 1-4 | 5.2 | 7.1 | 5.5 | 5.2 | 61 |

As a result, the instant rice of Example 1-1 prepared by the preparing system of the present application generally exhibited higher or similar levels of taste values of each cooked rice compared to other instant rice, and the instant rice of Example 1-2 was also measured to have excellent hardness and glutinousness values.

[1-3] Analysis of Physical Properties of White Rice

With respect to the instant rice (white rice Bap) of Examples 1-1 and 1-2 and Comparative Examples 1-1 to 1-3 heated using a microwave and the white rice of Comparative Example 1-4, the hardness, elasticity, adhesiveness and glutinousness thereof were measured using a physical property analyzer (Tensipresser Analyzer, MyBoy, TAKETOMO Electric Incorporated).

Specifically, to measure the physical properties, texture profile analysis (TPA) was performed using a physical property analyzer, and a TPA curve obtained after 6 bites was used. Specifically, the load applied to the plunger was measured by placing each sample in a holder of a physical property analyzer, moving a 30 mm-high plunger at a constant force and speed of 2.0 mm/s to apply the force to the sample surface, and applying 24% compression of the sample thickness two times, 46% compression two times and 92% compression two time continuously and vertically. The hardness was measured by a peak value when the plunger applies 92% compression of the sample thickness, which represents the force required to chew and crush the Bap. The elasticity was measured by dividing a curve area at 92% compression by a curve area at 24% compression, and means that the higher the elasticity value, the higher the chewed elasticity of the Bap. The adhesiveness may be measured by a negative peak value when the plunger applies 92% compression to the sample, which represents the force at the moment of removing the plunger stuck to the sample, and means that the larger the measured value, the higher the adhesiveness. The glutinousness may be measured by a negative area when the plunger applies 92% compression to the sample, which represents a sustained sticking force. Each value was repeatedly measured 5 times, and then the average values thereof are calculated.

TABLE 6

| | Hardness | Elasticity | Adhesiveness | Glutinousness |
|---|---|---|---|---|
| Example 1-1 | 36.89 | 44.54 | 48.89 | 51.19 |
| Example 1-2 | 22.54 | 33.85 | 49.59 | 52.63 |
| Comparative Example 1-1 | 56.59 | 47.19 | 30.67 | 33.39 |
| Comparative Example 1-2 | 25.48 | 36.53 | 49.91 | 51.89 |
| Comparative Example 1-3 | 26.69 | 38.00 | 56.88 | 65.85 |
| Comparative Example 1-4 | 38.46 | 43.88 | 30.26 | 38.62 |

As a result, as can be seen in Table 6, in the case of the instant rice of Comparative Example 1-1, it was measured to show an excessively high hardness and elasticity due to insufficient heat treatment required for sufficient gelatinization. In addition, the instant rice of Example 1-1 was measured to have hardness and elasticity values similar to those of the white rice of Comparative Example 1-4 prepared by a conventional cooking method. The hardness and elasticity of Bap tend to decrease when heat treatment is too excessive, and conversely, tend to increase when heat treatment is insufficient. In the instant rice of Comparative Examples 1-2 and 1-3, the hardness and elasticity were greatly reduced due to excessive heat treatment, but the instant rice of Example 1-1 prepared by the preparing system of the present application was measured to have higher hardness and elasticity and exhibited appropriate physical properties, and although the instant rice, it was confirmed that it has similar level of physical properties to those of the white rice of Comparative Examples 1-4 prepared by a conventional cooking method.

[1-4] Sensory Evaluation of White Rice

The instant rice (white rice Bap) of Examples 1-1 and 1-2, and Comparative Examples 1-1 to 1-3 was heated using a microwave, and then an evaluation on various kinds of sensory qualities was performed by trained professional panels. The sensory quality was evaluated by color preference, taste/flavor strength, overall taste preference, texture preference, and glutinousness preference of the instant rice, and the result is shown in Table 7 below. The evaluation criteria for the sensory quality are as follows.

[Evaluation Criteria]

Color preference: Provided that 1 point is a minimum value and 5 points are a maximum value, the higher the color preference, the higher the score.

Taste/flavor strength: Provided that 1 point is a minimum value and 5 points are a maximum value, it means that the higher the taste/flavor strength, the higher the score.

Overall taste preference: As it is an item to evaluate the overall taste, provided that 1 point is a minimum value and 5 points are a maximum value, it means that the better the overall taste preference, the higher the score.

Texture preference: Provided that 1 point is a minimum value and 5 points are a maximum value, it means that the higher the texture preference, the higher the score.

Glutinousness preference: Provided that 1 point is a minimum value and 5 points are a maximum value, it means that the higher the glutinousness preference, the higher the score.

TABLE 7

| | Color preference | Taste/flavor strength | Overall taste preference | Texture preference | Glutinousness preference |
|---|---|---|---|---|---|
| Example 1-1 | 4.5 | 1.5 | 3.5 | 3.2 | 3.7 |
| Example 1-2 | 4.5 | 1.4 | 3.5 | 3.2 | 3.7 |
| Comparative Example 1-1 | 4.6 | 1.3 | 3.6 | 3.6 | 3.3 |
| Comparative Example 1-2 | 3.5 | 2.3 | 2.7 | 2.3 | 3.0 |
| Comparative Example 1-3 | 2.7 | 2.3 | 2.3 | 2.3 | 2.6 |

As a result, the instant rice of Examples 1-1 and 1-2 was evaluated to have high preference in all of color, texture, glutinousness, and overall taste, and was also evaluated to have low taste and flavor strengths. The instant rice of Comparative Example 1-1 also received high evaluation in sensory evaluation, but was shown to have a similar level to the instant rice of Examples 1-1 and 1-2 prepared according to the preparing system of the present application.

Experimental Example 2

[2-1] Comparison of Chromaticity and Appearance of Whole Grain Rice

The instant rice (whole grain rice) of Example 2 and Comparative Examples 2-1 to 2-3, which were prepared with whole grains such as brown rice, black rice, whole wheat, and oats as raw ingredients, was heated for 2 minutes using a microwave (700 W), and then the lid material was removed, and the colors thereof were measured, and the appearances thereof were compared. For the colors, L, a, and b values were measured using an instrument manufactured by Konica Minolta company, and each value was measured three times, and average values thereof were shown in Table 8 below.

TABLE 8

| | L | a | b |
|---|---|---|---|
| Example 2 | 22.62 | 5.42 | 4.34 |
| Comparative Example 2-1 | 22.16 | 5.28 | 3.97 |
| Comparative Example 2-2 | 22.67 | 5.92 | 5.03 |
| Comparative Example 2-3 | 22.76 | 6.21 | 5.46 |

As a result, as can be seen in Table 8, the instant rice of Example 2 of the present application was measured to have a color similar to that of the instant rice of other Comparative Examples 2-1 to 2-3. Unlike the experimental results of white rice Bap, the whole grain rice did not show significant difference in color, including L value. However, as a result of observing the appearance, in the instant rice of Comparative Example 2-1, more grains, whose surfaces were burst and thus appeared white, were shown (FIG. 1). This is expected to be a result that the temperature conditions were too low in the method for preparing the instant rice in Comparative Example 2-1, and thus the outer skin of the grain is not softened, but only the interior absorbed moisture and swelled. In contrast, in the instant rice of Example 2 prepared according to the system for preparing the instant rice of the present application, since the same phenomenon as in Comparative Example 2-1 was not observed, it was indirectly confirmed that superior features in appearance quality were shown and the whole grain rice was sufficiently cooked.

[2-2] Analysis of Cooked Rice Taste of Whole Grain Rice

With respect to instant rice (whole grain rice) of Example 2 and Comparative Examples 2-1 to 2-3 heated using a microwave, the cooked grain taste values of each instant rice are shown in Table 9 below by measuring the appearance, hardness, glutinousness, balance, and palatability of the rice grains using a taste meter (Tensipresser My Boy 2 system, Taketomo Electric Company, Japan).

TABLE 9

| | Appearance | Hardness | Glutinousness | Balance | Palatability |
|---|---|---|---|---|---|
| Example 2 | 4.4 | 9.8 | 4.8 | 2 | 43 |
| Comparative Example 2-1 | 3.5 | 9.8 | 4.7 | 1.2 | 39 |
| Comparative Example 2-2 | 3.7 | 9.8 | 4.7 | 1.4 | 40 |
| Comparative Example 2-3 | 3.8 | 9.8 | 4.7 | 1.4 | 40 |

As a result, it was confirmed that the instant rice of Example 2 prepared by the preparing system of the present application was measured to have the highest values in all of appearance, hardness, glutinousness, and balance, compared with the instant rice of the Comparative Examples prepared by other methods, and thus it has the highest palatability value.

[2-3] Analysis of Physical Properties of Whole Grain Rice

With respect to the instant rice (whole grain rice) of Example 2 and Comparative Examples 2-1 to 2-3 heated using a microwave, the hardness, elasticity, adhesiveness, and glutinousness thereof were measured using a physical property analyzer (Tensipresser Analyzer, MyBoy, TAKETOMO Electric Incorporated) in the same method as Experimental Example 1-3, and are shown in Table 10 below.

TABLE 10

| | Hardness | Elasticity | Adhesiveness | Glutinousness |
|---|---|---|---|---|
| Example 2 | 26.32 | 34.17 | 29.77 | 23.49 |
| Comparative Example 2-1 | 23.95 | 39.14 | 26.36 | 22.70 |
| Comparative Example 2-2 | 14.22 | 27.30 | 32.25 | 23.25 |
| Comparative Example 2-3 | 20.06 | 32.99 | 29.49 | 21.40 |

As a result, as can be seen in Table 10 above, the instant rice of Example 2 was measured to have a hardness value higher than that of the instant rice of Comparative Examples 2-1 to 2-3. The hardness is an important physical property in determining the texture of Bap, and the instant rice of Comparative Examples 2-2 and 2-3 was measured to have low hardness by applying excessive heat, and the instant rice of Comparative Example 2-1 was observed that low level of heat was applied thereto, but the burst phenomenon of rice grain occurs as confirmed in Experimental Example 2-1 and FIG. 1, so it is expected to have lowered hardness. In contrast, in the case of Example 2 prepared according to the system for preparing the instant rice of the present application, it was confirmed that although the sterilization was performed through sufficient heating, the hardness was not lowered and the quality was maintained by maintaining the inact state of rice grains.

[2-4] Sensory Evaluation of Whole Grain Rice

The instant rice (whole grain rice) of Example 2 and Comparative Examples 2-1 to 2-3 was heated using a microwave, and then an evaluation on various kinds of sensory qualities was performed by trained professional panels. The sensory quality was evaluated by color preference, taste/flavor strength, overall taste preference, texture preference, and glutinousness preference of the instant rice in the same manner as in Experimental Example 1-4, and the result is shown in Table 11 below.

TABLE 11

| | Color preference | Taste/flavor strength | Overall taste preference | Texture preference | Glutinousness preference |
|---|---|---|---|---|---|
| Example 2 | 4.3 | 1.3 | 4.0 | 4.0 | 4.0 |
| Comparative Example 2-1 | 3.0 | 1.3 | 2.7 | 2.7 | 2.7 |
| Comparative Example 2-2 | 4.1 | 1.3 | 4.0 | 4.0 | 3.7 |
| Comparative Example 2-3 | 3.9 | 1.3 | 3.3 | 3.2 | 3.7 |

As a result, when compared with the whole grain rice of the Comparative Examples, the whole grain rice of Example 2 was measured to have the highest level in color preference, texture preference, and glutinousness preference, and even in the taste/flavor strength, the whole grain rice of Example 2 and Comparative Examples was also measured to have similar level and have no difference. Accordingly, it was confirmed that the whole grain rice of Example 2 prepared according to the preparing system of the present application exhibited superior sensory quality compared to Bap prepared through other methods.

Experimental Example 3

[3-1] Comparison of Chromaticity and Appearance of Mushroom Nutritious Rice

The instant rice (mushroom nutritious rice) of Example 3 and Comparative Examples 3-1 to 3-3 prepared with mushrooms such as king oyster mushroom and shiitake mushroom as raw ingredients was heated for 2 minutes using a microwave (700 W), and then the lid material was removed, and the colors of the king oyster mushroom were measured, and the appearances thereof were compared. For the colors, L, a, and b values were measured using an instrument manufactured by Konica Minolta company, and each value was measured three times, and average values thereof are shown in Table 12 below.

TABLE 12

| | L | a | b |
|---|---|---|---|
| Example 3 | 59.60 | 3.39 | 16.08 |
| Comparative Example 3-1 | 59.83 | 2.73 | 14.97 |
| Comparative Example 3-2 | 46.35 | 5.38 | 15.12 |
| Comparative Example 3-3 | 46.95 | 5.84 | 16.68 |

As a result, as can be seen in Table 12 above, the color of the king oyster mushroom contained in the instant rice of Example 3 of the present application was measured to have L value higher than the king oyster mushrooms in the instant rice of Comparative Examples 3-2 and 3-3. In the case of the method of Comparative Examples 3-2 and 3-3, as high-temperature heating process is involved, the color of the mushrooms became excessively dark, but in the instant rice of Example 3 prepared according to the method of the present application, it was confirmed that the colors of king oyster mushrooms remain bright even after heating. It was confirmed that such a color change was shown even in the results of visually observing the appearance of the mushroom, and the king oyster mushrooms of Comparative Examples 3-2 and 3-3 showed excessively dark colors (FIG. 2).

[3-2] Analysis of Cooked Rice Taste of Mushroom Nutritious Rice

With respect to instant rice (mushroom nutritious rice) of Example 3 and Comparative Examples 3-1 to 3-3 heated using a microwave, a cooked grain taste value of each instant rice was measured in the appearance, hardness, glutinousness, balance, and palatability of the rice grains using a taste meter (Tensipresser My Boy 2 system, Taketomo Electric Co., Japan), and the result is shown in Table 13 below.

TABLE 13

| | Appearance | Hardness | Glutinousness | Balance | Palatability |
|---|---|---|---|---|---|
| Example 3 | 3.8 | 9.88 | 4.9 | 2.3 | 45 |
| Comparative Example 3-1 | 1.5 | 9.8 | 3.5 | 0.2 | 31 |
| Comparative Example 3-2 | 2.9 | 9.8 | 4.4 | 1.4 | 39 |
| Comparative Example 3-3 | 3.5 | 9.8 | 5.7 | 1.9 | 43 |

As a result, the instant rice of Example 3 prepared through the preparing system of the present application was measured to have the highest value in the appearance, hardness, and balance values compared to the instant rice of the Comparative Examples prepared through other methods, and also measured to have the glutinousness higher than the mushroom nutritious rice of Comparative Examples 3-1 and 3-2, so it was confirmed that it has the highest palatability value.

[3-3] Analysis of Physical Properties of Mushroom Nutritious Rice

With respect to the instant rice (mushroom nutritious rice) of Example 3 and Comparative Examples 3-1 to 3-3 heated using a microwave, the texture strength (max stress), area and thickness of the king oyster mushroom were measured using a physical property analyzer (Tensipresser Analyzer, MyBoy, TAKETOMO Electric company), and the result is shown in Table 14 below. Specifically, a TPA curve obtained after one bite one time on the sample using a 3 $cm^2$ circular plunger was used. In this case, the distance between the plunger and the sample was set to 30 mm, and the sample was measured by compression at a speed of 2 mm/sec until reaching 5 mm from the bottom. The max stress value was measured as the highest point of the curve when compressed, which means the hardness of a general sample. In addition, the area was measured as the cumulative force until reaching the highest point.

TABLE 14

| | Max stress (dyn/cm2) | Area (erg/cm3) | Initial thickness (mm) | Thickness (mm) |
|---|---|---|---|---|
| Example 3 | 181250 | 22975 | 10 | 7.90275 |
| Comparative Example 3-1 | 229500 | 30000 | 10 | 8.18375 |
| Comparative Example 3-2 | 154000 | 16175 | 10 | 7.34575 |
| Comparative Example 3-3 | 122075 | 15945 | 10 | 7.63775 |

As a result, as can be seen in Table 14, the king oyster mushroom included in the instant rice of Example 3 was measured to have the highest thickness compared to the king oyster mushrooms of Comparative Examples 3-2 and 3-3, and it was confirmed that less shrinkage occurred in the king oyster mushroom. In the case of Comparative Example 3-1, it is expected that the applied heat is small, and thus the thickness is maintained relatively better. Even in the max stress value indicating texture strength, it was confirmed that the value of king oyster mushroom included in the instant rice of Example 3 was shown to be the highest, except for Comparative Example 3-1, but the texture of the king oyster mushroom was maintained better than in Comparative Examples 3-2 and 3-3 applied with more heat.

[3-4] Sensory Evaluation of Mushroom Nutritious Rice

The instant rice (mushroom nutritious rice) of Example 3 and Comparative Examples 3-1 to 3-3 was heated using a microwave, and then various kinds of sensory qualities were evaluated by trained professional panels. The sensory quality was evaluated by color preference, taste/flavor strength, overall taste preference, texture preference, and glutinousness preference of the instant rice in the same manner as in Experimental Example 1-4, and the result is shown in Table 15 below.

TABLE 15

| | Mushroom color preference | Taste/flavor strength | Overall taste preference | Mushroom texture preference | Glutinousness preference |
|---|---|---|---|---|---|
| Example 3 | 4.3 | 1.0 | 4.1 | 4.5 | 4.3 |
| Comparative Example 3-1 | 4.8 | 1.0 | 3.8 | 4.5 | 3.6 |
| Comparative Example 3-2 | 3.2 | 1.3 | 3.6 | 3.6 | 4.0 |
| Comparative Example 3-3 | 2.4 | 1.1 | 3.5 | 3.3 | 4.0 |

As a result, the mushroom nutritious rice of Example 3 was measured to have the highest level in the texture preference, overall taste preference, and glutinousness preference when compared to the mushroom nutritious rice of the Comparative Examples, and was evaluated to be generally high even in the color preference. The taste/favor strength was evaluated as the lowest in the mushroom nutritious rice of Example 3. Accordingly, it was confirmed that the mushroom nutritious rice of Example 3 prepared according to the preparing system of the present application exhibited superior sensory quality to rice prepared through other methods.

Experimental Example 4

[4-1] Comparison of Chromaticity of Honey Glutinous Rice

The lid material of the instant rice (honey glutinous rice) of Example 4, and Comparative Examples 4-1 and 4-2 prepared by adding the liquid sauce such as honey and soy sauce was removed and the colors thereof were measured and compared. In addition, the instant rice of Examples 4, and Comparative Examples 4-1 and 4-2 was heated using a microwave (700 W) for 2 minutes, and then the lid material was removed, and the colors thereof were measured and compared. For the colors, L, a, and b values were measured using an instrument manufactured by Konica Minolta company, and each value was measured three times, and average values thereof are shown in Tables 16 and 17 below, respectively.

TABLE 16

| Before heating | L | a | b |
|---|---|---|---|
| Example 4 | 34.57 | 5.92 | 14.03 |
| Comparative Example 4-1 | 33.13 | 5.84 | 13.40 |
| Comparative Example 4-2 | 36.17 | 5.92 | 13.88 |

TABLE 17

| After heating | L | a | b |
|---|---|---|---|
| Example 4 | 27.91 | 6.67 | 10.45 |
| Comparative Example 4-1 | 26.51 | 6.47 | 10.08 |
| Comparative Example 4-2 | 28.16 | 6.83 | 11.02 |

As a result, as can be seen in Tables 16 and 17 above, in the case of the honey glutinous rice in Example 4 of the present application, L value was measured to be relatively low and b value was measured to be high. The honey glutinous rice of Example 4 prepared according to the preparing system of the present application may be distinguished from the honey glutinous rice of Comparative Examples 4-1 and 4-2 in terms of color.

[4-2] Analysis of Cooked Rice Taste of Honey Glutinous Rice

With respect to instant rice (honey glutinous rice) of Example 4 and Comparative Examples 4-1 to 4-2 heated using a microwave, a cooked grain taste value of each instant rice was measured in the appearance, hardness, glutinousness, balance, and palatability of the rice grains using a taste meter (Tensipresser My Boy 2 system, Taketomo Electric Co., Japan), and the result is shown in Table 18 below.

TABLE 18

| | Appearance | Hardness | Glutinousness | Balance | Palatability |
|---|---|---|---|---|---|
| Example 4 | 8.4 | 9.4 | 9.8 | 7.3 | 74 |
| Comparative Example 4-1 | 8.7 | 9.0 | 9.8 | 7.5 | 78 |
| Comparative Example 4-2 | 8.7 | 8.9 | 9.8 | 7.4 | 77 |

As a result, in the instant rice of Example 4 prepared according to the preparing system of the present application, the hardness and glutinousness values were measured to be the highest compared to the instant rice of the Comparative Example prepared through other methods.

[4-3] Analysis of Physical Properties of Honey Glutinous Rice

With respect to the instant rice (honey glutinous rice) of Example 4 and Comparative Examples 4-1 to 4-2 heated using a microwave, the hardness, elasticity, adhesiveness, and glutinousness of the Bap were measured using a physical property analyzer (Tensipresser Analyzer, MyBoy, TAKETOMO Electric Incorporated) in the same method as Experimental Example 1-3, and the result is shown in Table 19 below.

TABLE 19

| | | Hardness | Elasticity | Adhesiveness | Glutinousness |
|---|---|---|---|---|---|
| Example 4 | 1 | 32.04 | 57.30 | 30.99 | 92.82 |
| | 2 | 27.42 | 54.17 | 33.92 | 70.89 |
| | 3 | 18.67 | 44.36 | 38.15 | 103.64 |
| | 4 | 26.64 | 54.59 | 29.63 | 96.46 |
| | 5 | 20.53 | 49.50 | 30.84 | 69.27 |
| | Average | 25.06 | 51.98 | 32.71 | 86.62 |
| | Deviation | 5.43 | 5.10 | 3.43 | 15.60 |
| Comparative | 1 | 35.74 | 64.95 | 35.03 | 153.97 |
| Example 4-1 | 2 | 31.98 | 60.28 | 29.18 | 69.40 |
| | 3 | 24.23 | 50.00 | 37.32 | 92.12 |
| | 4 | 94.55 | 99.83 | 23.37 | 113.30 |
| | 5 | 36.48 | 58.04 | 27.33 | 66.25 |
| | Average | 44.60 | 66.62 | 30.45 | 99.01 |
| | Deviation | 28.34 | 19.34 | 5.69 | 36.13 |
| Comparative | 1 | 28.87 | 59.41 | 37.55 | 106.77 |
| Example 4-2 | 2 | 20.45 | 48.85 | 36.58 | 112.24 |
| | 3 | 33.98 | 66.04 | 34.97 | 75.73 |
| | 4 | 57.00 | 105.50 | 21.57 | 75.08 |
| | 5 | 37.37 | 57.92 | 28.52 | 80.35 |
| | Average | 35.53 | 67.54 | 31.84 | 90.03 |
| | Deviation | 13.59 | 22.09 | 6.73 | 17.99 |

As a result, in the case of the honey glutinous rice of Example 4 prepared according to the preparing system of the present application, the measured result values of 1 to 5 samples are relatively uniform and a deviation therebetween is not large, but in the case of the honey glutinous rice of Comparative Examples 4-1 to 4-2, it was confirmed that a deviation in the measured values of physical properties for each sample was very large. In particular, the hardness and elasticity measured values of the honey glutinous rice in Comparative Examples 4-1 and 4-2 showed very large deviations, but the reason why the deviation between physical property values of the honey glutinous rice of Comparative Examples 4-1 and 4-2 was shown so large is expected to be due to the deviation in texture that occurs due to strong retort heat sterilization treatment. This property is shown prominently in the honey glutinous rice of Comparative Examples 4-1 and 4-2 having a high content of glutinous rice ingredients, and since the honey glutinous rice according to Example 4 does not have relatively large deviation in physical properties, it was confirmed that when the preparing system of the present application is used, an instant rice having consistent texture and quality can be prepared.

[4-4] Sensory Evaluation of Honey Glutinous Rice

The instant rice (honey glutinous rice) of Example 4 and Comparative Examples 4-1 to 4-2 was heated using a microwave, and then various kinds of sensory qualities were evaluated by trained professional panels. The sensory quality was evaluated by color preference, taste/flavor strength, overall taste preference, texture preference, and glutinousness preference of instant rice in the same manner as in Experimental Example 1-4, and the result is shown in Table 20 below.

TABLE 20

| | Color preference | Taste/flavor strength | Overall taste preference | Texture preference | Glutinousness preference |
|---|---|---|---|---|---|
| Example 4 | 4.0 | 1.3 | 4.0 | 4.0 | 4.0 |
| Comparative Example 4-1 | 3.5 | 1.3 | 3.7 | 3.1 | 3.8 |
| Comparative Example 4-2 | 3.6 | 1.3 | 3.0 | 2.8 | 3.4 |

As a result, when compared with the honey glutinous rice of the Comparative Examples, since the honey glutinous rice of Example 4 was measured to show the highest level in all of the color preference, overall taste preference, texture preference, and glutinousness preference, it was confirmed that it exhibits superior sensory quality as compared with Bap prepared through other methods.

Experimental Example 5

Confirmation of Nutritional Ingredients of Whole Grain Rice

The nutritional ingredients contained in the whole grain rice prepared in Example 2 were measured and confirmed. Based on the finished products whole grain rice, mushroom nutritious rice and honey glutinous rice, the calories thereof and the contents of carbohydrates, proteins, fats, sugars, saturated fat, trans fat, cholesterol, sodium, ash and dietary fibers were measured by a conventional measurement method according to the Food Code. For example, the proteins were measured by a protein analyzer analysis method in the Food Code, and the dietary fibers were measured by a total dietary fiber analysis method in the Food Code. The nutritional ingredients of the instant rice are shown in Table 21 below. Even if the whole grain rice was prepared using only mixed grains without using white rice, sufficient sterilizing force and texture may be maintained, and thus, the protein content and dietary fiber content in the instant rice of the present application were able to be maintained at higher levels than the protein and dietary fiber contents in conventional instant rice.

TABLE 21

| Instant rice | | Whole grain rice Content per 100 g |
|---|---|---|
| Calorie | kcal/100 g | 158.82 |
| carbohydrate | g/100 g | 32.85 |
| Protein | g/100 g | 4.35 |
| Fat | g/100 g | 1.12 |
| Sugars | g/100 g | 0.32 |
| Saturated fat | g/100 g | 0.26 |
| Trans fat | g/100 g | 0.01 |
| Cholesterol | g/100 g | 0.00 |
| Sodium | mg/100 g | 0.64 |
| Ash | g/100 g | 0.59 |
| Dietary fiber | g/100 g | 3.51 |

Experimental Example 6

Confirmation of the Number of Microorganisms in Whole Grain Rice

In order to confirm whether complete sterilization was performed in the whole grain rice product prepared by the preparing system of the present application, the number of microorganisms contained in the raw ingredients or product was measured for each step.

With respect to the whole grain rice according to Example 2, the number of general bacteria and the number of heat-resistant bacteria for each of the raw ingredients were first measured. The number of each bacterium was measured in non-glutinous brown rice, glutinous brown rice, black rice, whole wheat, and oats, and the number of microorganisms was measured in a mixed solid material sample mixed with them.

As a result, as shown in Table 22 below, it was measured that general bacteria were present above a certain level in the raw ingredients before going through the sterilization step, and at least 550,000 cfu/ml of general bacteria were present in the mixed solid material of the raw ingredients for preparing the instant rice.

TABLE 22

| Measuring sample | | General bacteria (cfu/ml) | Heat-resistant bacteria (cfu/ml) |
|---|---|---|---|
| Non-glutinous brown rice | | 4,200,000 | 0 |
| Glutinous brown rice | | 420,000 | 0 |
| Black rice | | 1,600,000 | 0 |
| Whole wheat | | 1,800 | 0 |
| Oats | | 11,000 | 0 |
| Mixed solid material | Sample 1 | 550,000 | 0 |
| | Sample 2 | 1,100,000 | 0 |
| | Sample 3 | 1,400,000 | 0 |

After the raw ingredients were filled into the container, a steam pressure sterilization was performed at a temperature of 130° C. for 5 minutes and 30 seconds in an RIC device according to the method of preparing the whole grain rice of Example 2, and then a sterilizing effect was confirmed through a microbiology challenge test (MCT). The MCT is a method of determining whether a product has process and distribution stability by artificially inoculating microorganisms and observing changes in order to check whether to control target bacteria during the actual process of the product. As general bacteria, an orange capsule (MesaLabs SASU-302) containing 106 CFU/ml of *Bacillus subtilis* (ATCC 5230) which died under F0 condition of about 4 or less, was used, and as heat-resistant bacteria, a purple capsule (MesaLabs SA-608) containing 106 CFU/ml of *Geobacillus stearotrhermophilus* (ATCC 7953) which died at an F0 of about 21 or less, was used. The raw ingredients sterilized with the RIC device using the capsules were cultured for up to 48 hours at a temperature of 35° C. for the orange capsule and 55 to 60° C. for the purple capsule, respectively, and then color changes were confirmed. If there was no color change, it is determined to be negative, and if the color was changed to yellow, it was determined to be positive (Table 23). As a result, it was confirmed that all microorganisms that existed in the raw ingredients before sterilization were killed as a result of a steam pressure sterilization using the RIC device, showing a sufficient sterilization effect.

TABLE 23

| Measuring sample | Sample name | MCT |
|---|---|---|
| RIC sterilized sample 1 | 4-carriage 1-stage 35° C. | Negative |
| RIC sterilized sample 2 | 4-carriage 1-stage 55° C. | Negative |
| RIC sterilized sample 3 | 4-carriage 7-stage 35° C. | Negative |
| RIC sterilized sample 4 | 4-carriage 7-stage 55° C. | Negative |
| RIC sterilized sample 5 | 4-carriage 12-stage 35° C. | Negative |
| RIC sterilized sample 6 | 4-carriage 12-stage 55° C. | Negative |

Furthermore, after the steam pressure sterilization, a finished instant rice product was prepared through water addition, sealing and additional heating processes, and bacterial growth experiments were conducted on the finished product. In the bacterial growth experiments, the instant rice product was stored at 35° ° C. for 10 days, and then sampled to determine the growth of general bacteria and heat-resistant bacteria according to a common measurement method in the art (based on the bacterial growth experiments according to the general test method of the Ministry of Food and Drug Safety), each finished product sample was preserved in an incubator at a temperature of 35 to 37° C. for at least 10 days, and then a specimen obtained from the sample was homogenized with a diluent and cultured in a culture medium at 35 to 37° C. for 45 to 51 hours, and then bacterial growth was measured. As a result, as shown in Table 24 below, since no bacterial growth was observed in all 12 instant rice samples, which were shown as negative, despite the presence of a large amount of microorganisms in the raw ingredients, it was confirmed that all microorganisms were killed in the instant rice prepared through the preparing system of the present application through sufficient sterilization.

TABLE 24

| Measuring sample | Sample name (carriage-stage-number) | Bacterial growth |
|---|---|---|
| Finished product sample 1 | 3-2-1 | Negative |
| Finished product sample 2 | 3-2-1 | Negative |
| Finished product sample 3 | 3-2-1 | Negative |
| Finished product sample 4 | 3-2-7 | Negative |
| Finished product sample 5 | 3-2-7 | Negative |
| Finished product sample 6 | 3-2-7 | Negative |
| Finished product sample 7 | 3-2-14 | Negative |
| Finished product sample 8 | 3-2-14 | Negative |
| Finished product sample 9 | 3-2-14 | Negative |
| Finished product sample 10 | 3-3-1 | Negative |
| Finished product sample 11 | 3-3-1 | Negative |
| Finished product sample 12 | 3-3-1 | Negative |

Hereinabove, representative Examples of the present application have been exemplarily described, but the scope of the present application is not limited to the specific Examples as described above, and can be changed appropriately by those skilled in the art within the scope described in the appended claims of the present application.

The invention claimed is:

1. A system for preparing instant rice, comprising:

a sterilizing unit for sterilizing raw ingredients filled in a container with a pressurized steam in a vacuum state, wherein the raw ingredients comprise (a) (i) rice and (ii) at least one selected from the group consisting of grains other than rice, beans, mushrooms, root and tuber crops, bulbs, seasoned vegetables, fruits, seeds, meat, fish, and eggs; or (b) at least one selected from the group consisting of grains other than rice, beans, mushrooms, root and tuber crops, bulbs, seasoned vegetables, fruits, seeds, meat, fish, and eggs, the sterilizing unit sequentially performs vacuum, steam sterilization, reduced pressure, and vacuum cooling on the raw ingredients, the steam sterilization performs a sterilization with steam at 120° C. to 140° C. for 1 minute to 10 minutes, or performs the sterilization by repeatedly injecting steam of 140° C. to 155° C. into the sterilized container 5 times to 10 times for 3 seconds to 10 seconds;

a filling unit for adding sterilized water or sterilized sauce to the sterilized raw ingredients in the container to seal the container with a lid; having the water or sauce and the sterilized raw ingredients therein; and a heating unit for heating the sealed container at a temperature of 90° C. to 125° C.

2. The system for preparing instant rice of claim 1, wherein the rice comprises at least one selected from the group consisting of white rice, black rice, brown rice, non-glutinous rice, and glutinous rice.

3. The system for preparing instant rice of claim 1, wherein the grains other than rice comprise at least one selected from the group consisting of barley, soybeans, red beans, foxtail millet, wheat, rye, bran, buckwheat, oats, millet, corn, and sorghum.

4. The system for preparing instant rice of claim 1, wherein the sterilizing unit comprises a RIC sterilization device.

5. The system for preparing instant rice of claim 1, wherein the system does not comprise a cooking unit.

6. The system for preparing instant rice of claim 5, wherein the cooking unit performs heating to a temperature of 90° C. to 120° C.

7. The system for preparing instant rice of claim 1, wherein the system is maintained at a temperature of 89° C. or lower before the sealed container is heated to the temperature of 90° C. to 125° C.

8. The system for preparing instant rice of claim 1, wherein the heating unit comprises a retort sterilization device.

9. The system for preparing instant rice of claim 1, wherein the raw ingredients have the number of microorganisms of $10^2$ cfu/ml to $10^8$ cfu/ml in the raw ingredients before sterilization.

10. The system for preparing instant rice of claim 1, further comprising a liquid sterilizing unit for sterilizing the water or sauce.

11. The system for preparing instant rice of claim 10, wherein the liquid sterilizing unit performs the sterilization for 6 minutes to 8 minutes by directly spraying steam of 130° C. to 140° C. to the water or sauce.

12. The system for preparing instant rice of claim 10, wherein the liquid sterilizing unit comprises a Direct-Steam Injection (DSI) sterilization device.

13. The system for preparing instant rice of claim 1, wherein the sterilizing unit sequentially performs vacuum, steam sterilization, reduced pressure, and vacuum cooling on water-soaked raw ingredients.

14. A method of preparing instant rice using the system of claim 1, comprising:

sterilizing raw ingredients filled in a container with a pressurized steam in a vacuum state;

adding sterilized water or sterilized sauce to the sterilized raw ingredients; and heating the container at a temperature of 90 °C to 125 °C.

15. The method according to claim 14, wherein the raw ingredients are sterilized with a pressurized steam at 120 °C to 140 °C for 1 minute to 10 minutes.

16. The method according to claim 14, wherein the sterilizing raw ingredients filled in a container with a pressurized steam in a vacuum state includes:

repeatedly injecting steam of 140° ° C. to 155 °C into the sterilized container 5 times to 10 times for 3 seconds to 10 seconds.

17. The method according to claim 14, wherein the raw ingredients have the number of microorganisms of $10^2$ cfu/ml to $10^8$ cfu/ml in the raw ingredients before sterilization.

18. The method according to claim 14, wherein the raw ingredients comprise at least one selected from the group consisting of grains, beans, mushrooms, root and tuber crops, bulbs, seasoned vegetables, fruits/seeds, meat, fish, and eggs.

* * * * *